United States Patent
Mizumura et al.

(10) Patent No.: US 9,290,697 B2
(45) Date of Patent: Mar. 22, 2016

(54) LIQUID CRYSTAL ORIENTATION PROMOTER, LIQUID CRYSTALLINE COMPOSITION, MACROMOLECULAR MATERIAL AND FILM

(71) Applicant: FUJIFILM Corporation, Tokyo (JP)

(72) Inventors: Masatoshi Mizumura, Ashigarakami-gun (JP); Shunya Katoh, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 213 days.

(21) Appl. No.: 14/029,004

(22) Filed: Sep. 17, 2013

(65) Prior Publication Data

US 2014/0014877 A1    Jan. 16, 2014

Related U.S. Application Data

(63) Continuation of application No. PCT/JP2012/057281, filed on Mar. 22, 2012.

(30) Foreign Application Priority Data

Mar. 24, 2011   (JP) .................................. 2011-066174

(51) Int. Cl.

| C09K 19/56 | (2006.01) |
|---|---|
| C09K 19/22 | (2006.01) |
| C09K 19/24 | (2006.01) |
| C09K 19/30 | (2006.01) |
| C09K 19/32 | (2006.01) |
| C09K 19/34 | (2006.01) |
| C09K 19/20 | (2006.01) |
| C09K 19/54 | (2006.01) |

(Continued)

(52) U.S. Cl.
CPC ............... *C09K 19/54* (2013.01); *C09K 19/063* (2013.01); *C09K 19/2007* (2013.01); *C09K 19/22* (2013.01); *C09K 19/24* (2013.01); *C09K 19/3068* (2013.01); *C09K 19/3086* (2013.01); *C09K 19/32* (2013.01); *C09K 19/322* (2013.01); *C09K 19/3405* (2013.01); *C09K 19/3444* (2013.01); *C09K 19/3455* (2013.01); *C09K 19/3491* (2013.01); *C09K 19/56* (2013.01); *C09K 2019/044* (2013.01); *C09K 2019/0448* (2013.01); *C09K 2019/122* (2013.01); *C09K 2019/161* (2013.01); *C09K 2019/181* (2013.01); *C09K 2019/2035* (2013.01); *C09K 2019/2078* (2013.01); *C09K 2019/3422* (2013.01)

(58) Field of Classification Search
CPC .... C07C 69/75; C07C 69/92; C09K 19/2007; C09K 19/22; C09K 19/24; C09K 19/3068; C09K 19/32; C09K 19/322; C09K 19/3402; C09K 19/3444; C09K 19/3458; C09K 19/586; C09K 2019/044; C09K 2019/0448; C09K 2019/3422; C09K 2019/2035; C09K 19/3048; C09K 19/3059; C09K 19/56; C09K 2019/063; C09K 2019/066; C09K 2019/122; C09K 2219/03

See application file for complete search history.

(56) References Cited

U.S. PATENT DOCUMENTS

| 3,668,233 A | 6/1972 | Pavlik |
|---|---|---|
| 6,338,808 B1 | 1/2002 | Kawata et al. |

(Continued)

FOREIGN PATENT DOCUMENTS

| EP | 0603786 A2 | 6/1994 |
|---|---|---|
| JP | 10-120629 A | 5/1998 |

(Continued)

OTHER PUBLICATIONS

Machine generated English translation for EP0603786 provided by EPO, 1994.*

(Continued)

*Primary Examiner* — Shean C Wu

(74) *Attorney, Agent, or Firm* — Birch, Stewart, Kolasch & Birch, LLP

(57) ABSTRACT

A liquid crystal orientation promoter including a compound represented by the following formula (I) is a material that exhibits a sufficient solubility, has a wide available concentration range, and exhibits excellent liquid crystal orientation promoting property [$L^1$ to $L^6$ represent a single bond, —O—, —CO—, —COO— and the like; Sp represents a single bond or an alkylene group having 1 to 10 carbon atoms; $A^1$ and $A^2$ represent a divalent aromatic hydrocarbon group or a heterocyclic group; T represents the following linking group or the like; Hb represents an alkyl fluoride group having 3 to 30 carbon atoms; k, l, m, n and p represent integers of 0 or more; and o represents an integer of 1 to 4].

Formula (I)

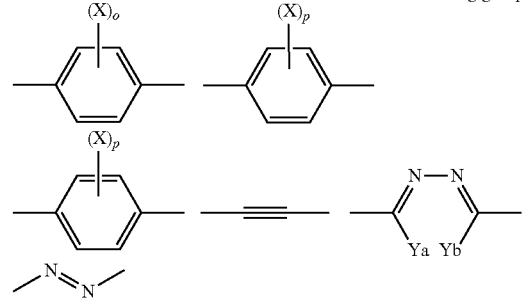

9 Claims, No Drawings

(51) Int. Cl.
*C09K 19/06* (2006.01)
*C09K 19/04* (2006.01)
*C09K 19/12* (2006.01)
*C09K 19/18* (2006.01)
*C09K 19/16* (2006.01)

(56) References Cited

U.S. PATENT DOCUMENTS

| | | |
|---|---|---|
| 6,485,798 B1 | 11/2002 | Aminaka et al. |
| 6,875,483 B2 | 4/2005 | Ichihashi et al. |
| 2002/0039627 A1 | 4/2002 | Ichihashi et al. |
| 2007/0134444 A1 | 6/2007 | Harding et al. |
| 2009/0018305 A1 | 1/2009 | Yoshida et al. |

FOREIGN PATENT DOCUMENTS

| | | |
|---|---|---|
| JP | 10-147784 A | 6/1998 |
| JP | 11-50054 A | 2/1999 |
| JP | 2000-345164 A | 12/2000 |
| JP | 2002-129162 A | 5/2002 |
| JP | 2007-16207 A | 1/2007 |

OTHER PUBLICATIONS

Forms PCT/IB/338, PCT/IB/373, PCT/ISA/237 and PCT/IB/326, dated Oct. 3, 2013, for International Application No. PCT/JP2012/057281.
International Search Report for PCT/JP2012/057281 dated May 29, 2012.
Written Opinion of the International Searching Authority for PCT/JP2012/057281 dated May 29, 2012.
Chinese Office Action dated Jul. 30, 2015, issued in corresponding Chinese Patent Application No. 201280014746.7.
Chinese Office Action dated Jan. 13, 2015, issued in corresponding Chinese Patent Application No. 201280014746.7.
Extended European Search Report dated Sep. 30, 2014 for European Application No. 12760462.7.
Small et al., "Induction of smectic layering in nematic liquid crystals using immiscible components III. The effect of lateral n-alkanoyl substituents on the thermotropic behaviour of 2,5-bis . . . ," Liquid Crystals, vol. 26, No. 6, 1999, pp. 849-857, XP000830487.

\* cited by examiner

LIQUID CRYSTAL ORIENTATION PROMOTER, LIQUID CRYSTALLINE COMPOSITION, MACROMOLECULAR MATERIAL AND FILM

CROSS-REFERENCE TO RELATED APPLICATIONS

This application is a continuation application of International Application No. PCT/JP2012/057281, filed Mar. 22, 2012, which in turn claims the benefit of priority from Japanese Application No. 2011-066174, filed Mar. 24, 2011, the disclosures of which Applications are incorporated by reference herein in their entirety.

BACKGROUND OF THE INVENTION

1. Field of the Invention

The present invention relates to a liquid crystal orientation promoter useful in a variety of uses including materials of a variety of optical members, such as an optical anisotropic film and a heat shielding film, a liquid crystalline composition including the promoter, a macromolecular material, and a film for which the liquid crystalline composition and the macromolecular material are used.

2. Background Art

When coated on a film on which an orientation treatment has been carried out (oriented film), liquid crystals are regularly oriented. In addition, the orientation state of liquid crystals can be controlled by sandwiching the liquid crystals between two oriented films. Therefore, in a liquid crystal display apparatus made up of a liquid crystal cell made up of rod-shaped liquid crystalline molecules and two substrates for sealing the molecules and an electrode layer for applying a voltage to the rod-shaped liquid crystalline molecules, since a state in which the rod-shaped liquid crystalline molecules are injected into gaps in the oriented film formed on the two substrates is formed, it is possible to relatively easily control the orientation state of the rod-shaped liquid crystalline molecules.

Meanwhile, for the purpose of the extension of the viewing angle of the liquid crystal display apparatus or the removal of coloration, an optical compensation sheet (wave plate) is disposed between the liquid crystal cell and a polarization plate. In this case, an optical anisotropic element having an optical anisotropic layer formed of liquid crystalline molecules on a transparent support is used as the optical compensation sheet. The optical anisotropic layer is formed by orienting the liquid crystalline molecules and fixing the orientation state. At this time, the liquid crystalline molecules are oriented using one oriented film provided between the transparent support and the optical anisotropic layer. However, it is difficult to uniformly orient (monodomain orientation) the liquid crystalline molecules from an oriented film interface to an air interface using one oriented film. This is because there is no orientation restraining force on a side of an interface on which an orientation treatment has not been carried out (the air interface), and therefore the orientation of the liquid crystals is disarrayed. When the liquid crystalline molecules are not uniformly oriented, light scattering is caused due to disclination, and an opaque film is formed. The above film is not preferable from the viewpoint of the improvement of the visibility of the liquid crystal display apparatus.

For the above necessity, attempts are being made to develop techniques that uniformly orient liquid crystals on the side of the interface on which an orientation treatment has not been carried out (the air interface) by supplying an orientation restraining force even when no oriented film is provided (Patent Literature 1). Here, the orientation of the liquid crystalline molecules is controlled by adding a liquid crystal orientation promoter. In addition, a liquid crystalline composition in which liquid crystalline molecules are easily and uniformly oriented using a liquid crystal orientation promoter is provided.

CITATION LIST

Patent Literature 1: JP-A-2002-129162

SUMMARY OF THE INVENTION

However, the liquid crystal orientation promoter described in Patent Literature 1 could not be used in a sufficient range of concentration or solubility at all times, and an improvement was still required. In addition, there is a demand for providing materials that exhibit an equal or better liquid crystal orientation promoting action compared with the liquid crystal orientation promoter described in Patent Literature 1. Therefore, an object of the invention is to solve the problems of the related art and to provide a material that exhibits a sufficient solubility, has a wide available concentration range, and exhibits excellent liquid crystal orientation promoting properties. In addition, another object is to provide a new liquid crystalline composition in which liquid crystalline molecules are easily and uniformly oriented using the above material. That is, the object of the invention is to provide a liquid crystal orientation promoter useful in a variety of uses including materials of a variety of optical members, such as an optical anisotropic film and a heat shielding film, a liquid crystalline composition including the promoter, a macromolecular material, and a film for which the liquid crystalline composition and the macromolecular material are used.

Means for achieving the above object is as follows.

[1] A liquid crystal orientation promoter including a compound represented by a formula (I).

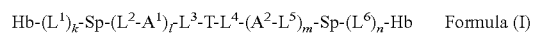

Hb-(L$^1$)$_k$-Sp-(L$^2$-A$^1$)$_l$-L$^3$-T-L$^4$-(A$^2$-L$^5$)$_m$-Sp-(L$^6$)$_n$-Hb   Formula (I)

[In the formula, each of L$^1$, L$^2$, L$^3$, L$^4$, L$^5$ and L$^6$ independently represents a single bond, —O—, —S—, —CO—, —OCO—, —OCO—, —COS—, —SCO—, —NRCO— or —CONR— (R represents a hydrogen atom or an alkyl group having 1 to 6 carbon atoms). In addition, Sp represents a single bond or an alkylene group having 1 to 10 carbon atoms, non-adjacent methylene groups in the alkylene may be substituted by —O—, —S—, —CO—, —OCO—, —OCO—, —COS—, —SCO—, —NRCO— or —CONR—, each of A$^1$ and A$^2$ independently represents a divalent aromatic hydrocarbon group or a heterocyclic group, T represents a divalent group or an aromatic heterocyclic group represented by

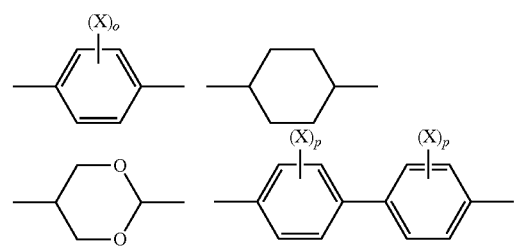

-continued

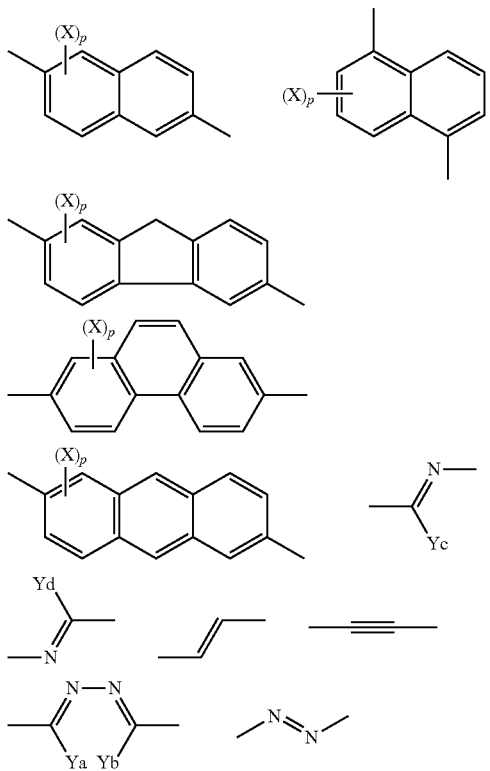

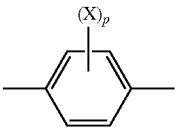

[in the formula, p represents an integer of any of 0 to 4.]
in the formula (I).

[5] The liquid crystal orientation promoter according to any one of [1] to [4], in which $L^3$ is —COO—, $L^4$ is —OCO—, $A^1$ and $A^2$ are phenylene groups, and $L^2$ and $L^5$ are —O—.

[6] A liquid crystalline composition including polymerizable liquid crystalline molecules and a compound represented by the formula (I).

[7] The liquid crystalline composition according to [6], in which the polymerizable liquid crystalline molecules are polymerizable rod-shaped molecules.

[8] The liquid crystalline composition according to [6] or [7] containing at least one chiral compound.

[9] A macromolecular material formed by polymerizing the liquid crystalline composition according to any one of [6] to [8].

[10] A film containing at least one of the macromolecular materials according to [9].

[11] A film formed by fixing a cholesteric liquid crystalline phase of the liquid crystalline composition of any one of [6] to [8].

[12] The film according to [10] or [11] exhibiting optical anisotropy.

[13] The film according to any one of [10] to [12] exhibiting selective reflection characteristics.

[14] The film according to [13] exhibiting selective reflection characteristics in an infrared ray wavelength range.

According to the invention, it is possible to provide a liquid crystalline composition useful in a variety of uses including materials of a variety of optical members, such as an optical anisotropic film and a heat shielding film, a macromolecular material, and a film for which the liquid crystalline composition and the macromolecular material are used by using an orientation promoter represented by the formula (I) which has a wide available concentration range, a high solvent solubility and a favorable liquid crystal orientation promoting action.

MODE FOR CARRYING OUT THE INVENTION

Hereinafter, the invention will be described in detail. Configuration requirements described below will be described based on typical embodiments or specific examples of the invention, but the invention is not limited to the above embodiments or specific examples. Meanwhile, numeric ranges expressed using "to" in the present specification include numeric values before and after "to" as the lower limit value and the upper limit value.

[Liquid Crystal Orientation Promoter]

The liquid crystal orientation promoter of the invention contains a compound represented by the following formula (I). The compound of the following formula (I) has a divalent group in the center, and has an alkyl fluoride group at the end. A compound having an alkyl fluoride group at the end is effective as an orientation promoter, but known orientation promoters of the related art had narrow available concentration ranges and low solubility, and thus were used in limited ranges. The compound of the following formula (I) exhibits equal or better orientation performances in a wider concen- (X represents an alkyl group having 1 to 8 carbon atoms, an alkoxy group, a halogen atom, a cyano group or —COOR⁰ ($R^0$ represents a hydrogen atom, an alkyl group or an alkyl fluoride group in which an adjacent $CH_2$ may be substituted by O or S, or -Sp⁵-P, Sp⁵ represents a single bond or an alkylene group having 1 to 10 carbon atoms (here, a hydrogen atom in the alkylene group may be substituted by a fluorine atom), and P represents a polymerizable group), and each of Ya, Yb, Yc and Yd independently represents a hydrogen atom or an alkyl group having 1 to 4 carbon atoms), Hb represents an alkyl fluoride group having 3 to 30 carbon atoms, each of k, l, m, n and p independently represents an integer of 0 or more, and o is an integer of any of 1 to 4. When k, l, m, n, o and p are 2 or more, a plurality of structures in parentheses may be equal or different.]

[2] The liquid crystal orientation promoter according to [1], in which l=m=1 and k=n=0 in the formula (I).

[3] The liquid crystal orientation promoter according to [1] or [2], in which T is

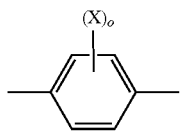

in the formula (I).

[4] The liquid crystal orientation promoter according to any one of [1] to [3], in which each of $A^1$ and $A^2$ is independently tration range with a more favorable solubility, and therefore a composition including the above compound has a merit of being easily used for manufacturing the composition. In addition, since the composition can be cured through polymerization, the composition is useful in a variety of uses, such as optical members.

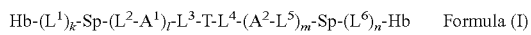

Hb-(L$^1$)$_k$-Sp-(L$^2$-A$^1$)$_l$-L$^3$-T-L$^4$-(A$^2$-L$^5$)$_m$-Sp-(L$^6$)$_n$-Hb    Formula (I)

In the formula (I), each of L$^1$, L$^2$, L$^3$, L$^4$, L$^5$ and L$^6$ independently represents a single bond, —O—, —S—, —CO—, —OCO—, —OCO—, —COS—, —SCO—, —NRCO— or —CONR— (R represents a hydrogen atom or an alkyl group having 1 to 6 carbon atoms), more preferably represents —O—, —S—, —CO—, —OCO—, —OCO—, —COS— or —SCO—, and still more preferably represents —O—, —CO—, —OCO— or —OCO—. The alkyl group that can be used as the R may have a linear shape or a branched shape, more preferably has 1 to 3 carbon atoms, and examples thereof include a methyl group, an ethyl group and an n-propyl group.

Sp represents a single bond or an alkylene group having 1 to 10 carbon atoms, more preferably represents a single bond or an alkylene group having 1 to 7 carbon atoms, and still more preferably a single bond or an alkylene group having 1 to 4 carbon atoms. Non-adjacent methylene groups in the alkylene may be substituted by —O—, —S—, —CO—, —COO—, —COO—, —COS—, —SCO—, —NRCO—, —CONR— or —OH. The alkylene group may or may not have branches, but is preferably a linear alkylene group having no branch.

A$^1$ and A$^2$ represent divalent aromatic hydrocarbon groups or divalent heterocyclic groups, and more preferably divalent aromatic hydrocarbons. The divalent aromatic hydrocarbon group has a number of carbon atoms of preferably 6 to 22, more preferably 6 to 14, still more preferably 6 to 10, and is most preferably a phenylene group. In a case in which A$^1$ and A$^2$ are phenylene groups, the phenylene groups preferably have atomic bonds at meta positions or para positions, and particularly preferably have atomic bonds at para positions. The divalent heterocyclic group preferably has a 5-membered, 6-membered or 7-membered heterocyclic ring. A 5-membered ring or 6-membered ring is more preferable, and a 6-membered ring is most preferable. A heteroatom that configures the heterocyclic ring is preferably a nitrogen atom, an oxygen atom or a sulfur atom. The heterocyclic ring is preferably an aromatic heterocyclic ring. The aromatic heterocyclic ring is generally an unsaturated heterocyclic ring. An unsaturated heterocyclic ring having most double bonds is more preferable. Examples of the heterocyclic ring include a furan ring, a thiophene ring, a pyrrole ring, a pyrroline ring, a pyrrolidine ring, an oxazole ring, an isoxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazan ring, a tetrazole ring, a pyran ring, a thiine ring, a pyridine ring, a piperidine ring, an oxazine ring, a morpholine ring, a thiazine ring, a pyridazine ring, a pyrimizine ring, a pyrazine ring, a piperazine ring and a triazine ring. The divalent aromatic hydrocarbon group or the divalent heterocyclic ring group represented by A$^1$ and A$^2$ may have a substituent. Examples of the substituent include an alkyl group having 1 to 8 carbon atoms, an alkoxy group, a halogen atom, a cyano group and an ester group. Regarding the descriptions and preferable ranges of the above groups, the following corresponding description of T can be referenced. Examples of the substituent with respect to the divalent aromatic hydrocarbon group or the divalent heterocyclic ring group represented by A$^1$ and A$^2$ include a methyl group, an ethyl group, a methoxy group, an ethoxy group, a bromine atom, a chlorine atom, a cyano group and the like. A$^1$ and A$^2$ are preferably equal.

T represents a divalent group or a divalent aromatic heterocyclic group represented by

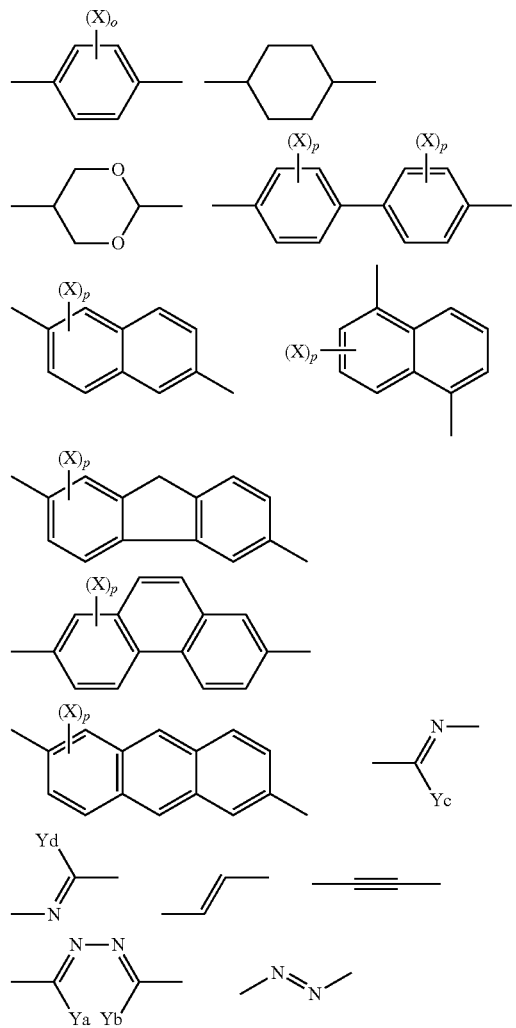

(X represents an alkyl group having 1 to 8 carbon atoms, an alkoxy group, a halogen atom, a cyano group or —COOR$^0$ (R$^0$ represents a hydrogen atom, an alkyl group or an alkyl fluoride group in which an adjacent CH$_2$ may be substituted by O or S, or -Sp$^5$-P, Sp$^5$ represents a single bond or an alkylene group having 1 to 10 carbon atoms (here, a hydrogen atom in the alkylene group may be substituted by a fluorine atom), and P represents a polymerizable group), and each of Ya, Yb, Yc and Yd independently represents a hydrogen atom or an alkyl group having 1 to 4 carbon atoms), is more preferably

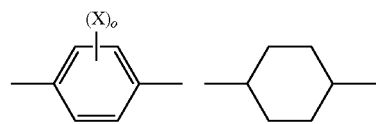

-continued

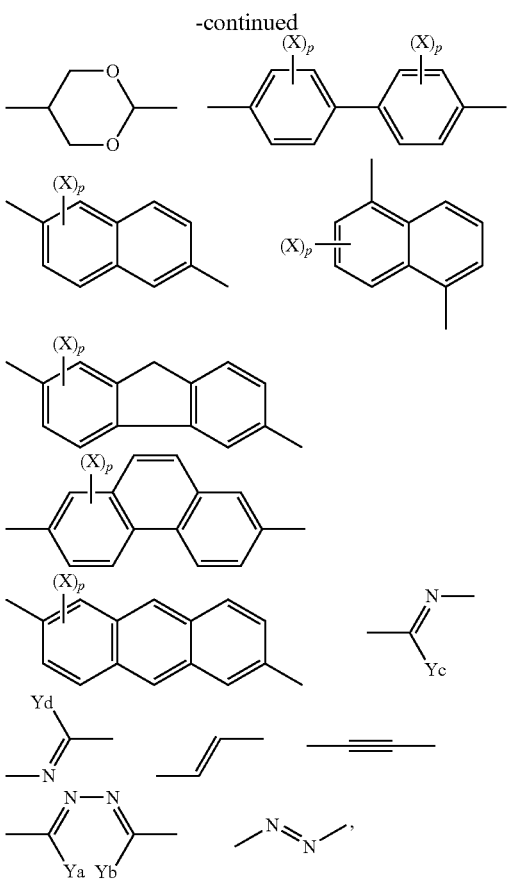

and still more preferably

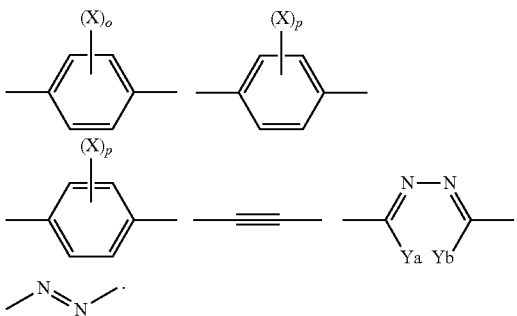

The number of carbon atoms in the alkyl group that can be used as X is 1 to 8, preferably 1 to 5, and more preferably 1 to 3. The alkyl group may have any of a linear shape, a branched shape and a cyclic shape, and preferably has a linear shape or a branched shape. Examples of the preferable alkyl group include a methyl group, an ethyl group, an n-propyl group, an isopropyl group and the like.

Regarding an alkyl portion of the alkoxy group that can be used as X, the description and preferable range of the alkyl group that can be used as X can be referenced.

Examples of the halogen atom that can be used as X include a fluorine atom, a chlorine atom, a bromine atom and an iodine atom, and a chlorine atom and a bromine atom are preferable.

Examples of the ester group that can be used as X include groups represented by RCOO—. Examples of R include an alkyl group having 1 to 8 carbon atoms. Regarding the description and preferable range of the alkyl group that can be used as R, the description and preferable range of the alkyl group that can be used as X can be referenced. Specific examples of the ester include $CH_3COO—$ and $C_2H_5COO—$.

In —$COOR^0$, $R^0$ represents a hydrogen atom, an alkyl group or an alkyl fluoride group in which an adjacent $CH_2$ may be substituted by O or S, or -$Sp^5$-P.

In a case in which $R^0$ represents an alkyl group or an alkyl fluoride group in which an adjacent $CH_2$ may be substituted by O or S, $R^0$ is more preferably a group represented by -$Sp^6$-($L^7$-$Sp^7$)$_q$—$CH_3$ or a group represented by -$Sp^8$-($L^8$-$Sp^9$)$_r$-$Hb^0$.

Each of $Sp^6$, $Sp^7$, $Sp^8$ and $Sp^9$ independently represents a single bond or an alkylene group having 1 to 10 carbon atoms, is preferably a single bond or an alkylene group having 1 to 7 carbon atoms, and more preferably a single bond or an alkylene group having 1 to 4 carbon atoms. Here, a hydrogen atom in the alkylene group represented by $Sp^6$, $Sp^7$, $Sp^8$ and $Sp^9$ may be substituted by a fluorine atom, but is preferably not substituted, and the alkylene group may or may not have a branch, but is preferably a linear alkylene group having no branch.

Each of $L^7$ and $L^8$ independently represents a single bond, —O—, —S—, —CO—, —OCO—, —OCO—, —COS—, —SCO—, —NRCO— or —CONR—(R in $L^7$ and $L^8$ represents a hydrogen atom or an alkyl group having 1 to 6 carbon atoms). Since —NRCO— and —CONR— have an effect of decreasing solubility, and tend to increase the haze value during the production of a film, $L^7$ and $L^8$ are preferably —O—, —S—, —CO—, —OCO—, —COO—, —COS— or —SCO—, more preferably —O—, —CO—, —COO— or —COO— from the viewpoint of the stability of the compound, and still more preferably —O—.

q represents an integer of 1 to 4, is preferably an integer of 1 to 3, more preferably 2 or 3, and particularly preferably 3. r represents an integer of 1 to 4, is preferably an integer of 1 to 3, more preferably 1 or 2, and particularly preferably 1. In a case in which q and r are integers of 2 or more, each of a plurality of $L^7$, $L^8$, $Sp^7$ and $Sp^9$ may be independent or different.

$Hb^0$ represents a perfluoroalkyl group or a fluoroalkyl group having 2 to 30 carbon atoms, is more preferably a perfluoroalkyl group or a fluoroalkyl group having 3 to 20 carbon atoms, and still more preferably a perfluoroalkyl group or a fluoroalkyl group having 3 to 10 carbon atoms. The perfluoroalkyl group or the fluoroalkyl group may have any of a linear shape, a branched shape and a cyclic shape, but preferably has a linear shape or a branched shape, and more preferably has a linear shape. Of the perfluoroalkyl group having 2 to 30 carbon atoms and the fluoroalkyl group having 2 to 30 carbon atoms, the $Hb^0$ is preferably the perfluoroalkyl group having 2 to 30 carbon atoms.

In a case in which $R^0$ is -$Sp^5$-P, $Sp^5$ represents a single bond or an alkylene group having 1 to 10 carbon atoms, is preferably a single bond or an alkylene group having 1 to 7 carbon atoms, and more preferably an alkylene group having 1 to 4 carbon atoms. Here, a hydrogen atom in the alkylene group represented by $Sp^5$ may be substituted by a fluorine atom, and the alkylene group may or may not have a branch, but is preferably a linear alkylene group having no branch.

The P represents a polymerizable group, and the polymerizable group is not particularly limited, but preferably an ethylenic unsaturated double-bonded group, more preferably a methacryloyl group or an acryloyl group, and particularly preferably an acryloyl group.

The alkyl group having 1 to 4 carbon atoms that can be used as Ya, Yb, Yc and Yd may have a linear shape or a branched shape. Examples thereof include a methyl group, an ethyl group, an n-propyl group, an isopropyl group and the like. Regarding the description and preferable range of the divalent aromatic heterocyclic group, the description and explanation of the aromatic heterocyclic group of the following $A^1$ and $A^2$ can be referenced.

Hb represents an alkyl fluoride group having 3 to 30 carbon atoms, is more preferably an alkyl fluoride group having 3 to 20 carbon atoms, and still more preferably an alkyl fluoride group having 3 to 10 carbon atoms. Here, the alkyl fluoride group may or may not be substituted by hydrogen. The alkyl fluoride group may have any of a linear shape, a branched shape and a cyclic shape, but preferably has a linear shape or a branched shape, and more preferably has a linear shape. Preferable examples of the alkyl fluoride group include an alkyl fluoride group having a perfluoroalkyl group at the end. That is, the alkyl fluoride group is preferably a group represented by the following formula.

$$C_pF_{2p+1}-(C_qH_{2q})-$$

In the above formula, p is preferably 1 to 30, more preferably 1 to 20, and still more preferably 1 to 10. q is preferably 0 to 20, more preferably 0 to 10, and still more preferably 0 to 5. p+q is 3 to 30.

k, l, m, n and p represent integers of 0 or more, and o is any integer of 1 to 4. In addition, when k, l, m, n, o and p are 2 or more, a plurality of structures in parentheses may be equal or different. For example, when k is 2, two $L^1$s present in a molecule may be mutually equal or different. k, l, m and n in the formula (I) are preferably any integers of 0 to 6, more preferably any integers of 0 to 4, still more preferably any integers of 0 to 3, and most preferably any integers of 0 to 2. Examples of a preferable combination of k, l, m and n in the formula (I) include a combination in which l=m=1 and k=n=0 and a combination in which l=m=1 and k=n=1, and a more preferable combination is a combination in which l=m=1 and k=n=0. o is preferably 1 or 2. p is preferably any integer of 1 to 4, and more preferably 1 or 2.

The compound represented by the formula (I) may have a symmetric molecular structure or may have an asymmetric molecular structure. Meanwhile, the symmetric molecular structure mentioned herein refers to any of point-symmetric, line-symmetric and rotation-symmetric molecular structures, and the asymmetric molecular structure refers to a molecular structure that does not belong to any of point-symmetric, line-symmetric and rotation-symmetric molecular structures.

The compound represented by the formula (I) is a compound in which the above-described alkyl fluoride group (Hb), a linking group $(L^1)_k$-Sp-$(L^2-A^1)_l$-$L^3$ and -$L^4$-$(A^2-L^5)_m$-Sp-$(L^6)_n$ and T, which is a divalent group having an excluded volume effect, are combined. Two alkyl fluoride groups (Hb) present in the molecule are preferably mutually equal, and the linking groups present in the molecule $(L^1)_k$-Sp-$(L^2-A^1)_l$-$L^3$ and -$L^4$-$(A^2-L^5)_m$-Sp-$(L^6)_n$ are also preferably mutually equal. Hb-$(L^1)_k$-Sp- and -Sp-$(L^6)_n$-Hb at the ends are preferably groups represented by any of the following formulae.

$$(C_pF_{2p+1})-(C_qH_{2q})-$$

$$(C_pF_{2p+1})-(C_qH_{2q})-O-(C_rH_{2r})-$$

$$(C_pF_{2p+1})-(C_qH_{2q})-COO-(C_rH_{2r})-$$

$$(C_pF_{2p+1})-(C_qH_{2q})-OCO-(C_rH_{2r})-$$

In the above formula, p is preferably 1 to 30, more preferably 1 to 20, and still more preferably 1 to 10. q is preferably 0 to 20, more preferably 0 to 10, and still more preferably 0 to 5. p+q is 3 to 30. r is preferably 1 to 10, and more preferably 1 to 4.

In addition, when l in the formula (I) is 1 or more, Hb-$(L^1)_k$-Sp-$L^2$- and -$L^5$-Sp-$(L^6)_n$-Hb at the ends are preferably groups represented by any of the following formulae.

$$(C_pF_{2p+1})-(C_qH_{2q})-O$$

$$(C_pF_{2p+1})-(C_qH_{2q})-COO-$$

$$(C_pF_{2p+1})-(C_qH_{2q})-O-(C_rH_{2r})-O-$$

$$(C_pF_{2p+1})-(C_qH_{2q})-COO-(C_rH_{2r})-COO-$$

$$(C_pF_{2p+1})-(C_qH_{2q})-OCO-(C_rH_{2r})-COO-$$

In the above formulae, the definitions of p, q and r are equal to the above definitions.

Hereinafter, specific examples of the compound represented by the formula (I) will be described. However, the compound represented by the formula (I) which can be employed in the invention are not supposed to be restrictively interpreted by the following specific examples.

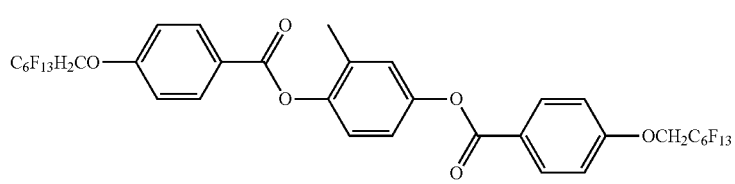

(1)

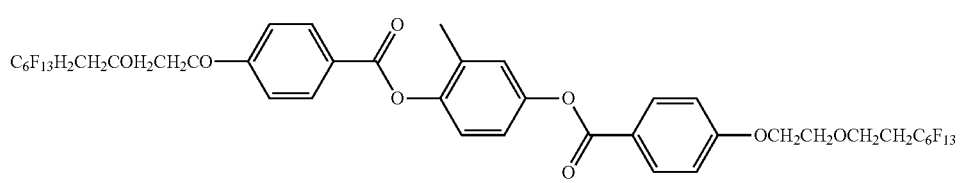

(2)

-continued
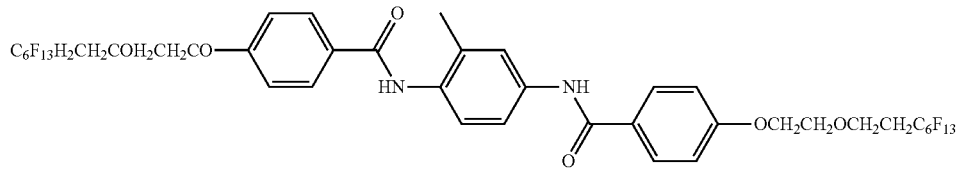
(3)
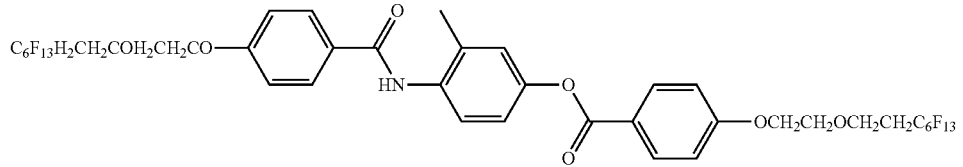
(4)
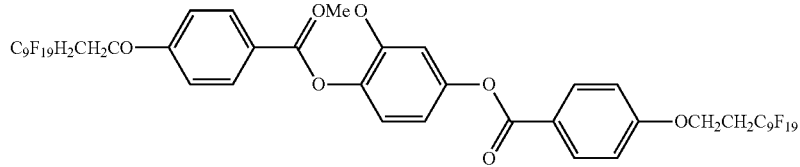
(5)
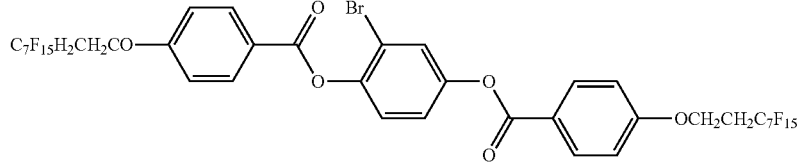
(6)
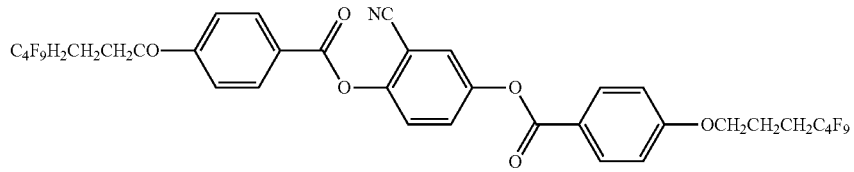
(7)
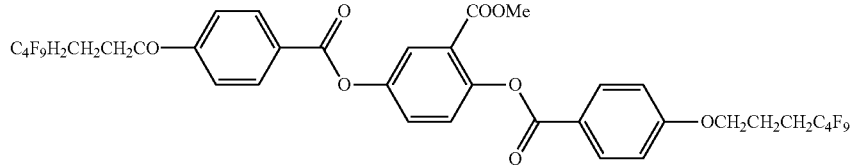
(8)
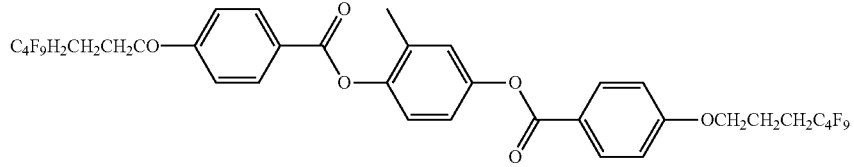
(9)
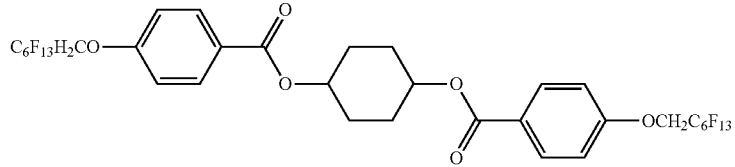
(10)
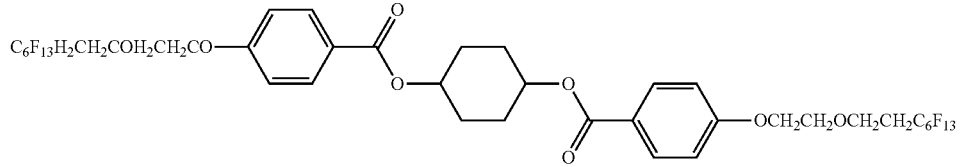
(11)

-continued
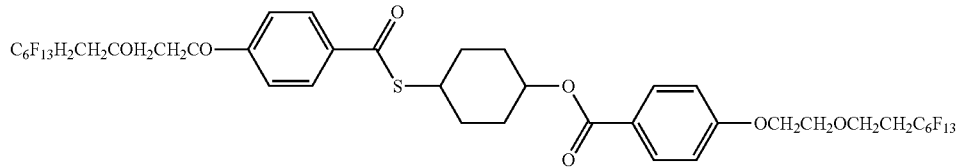
(12)
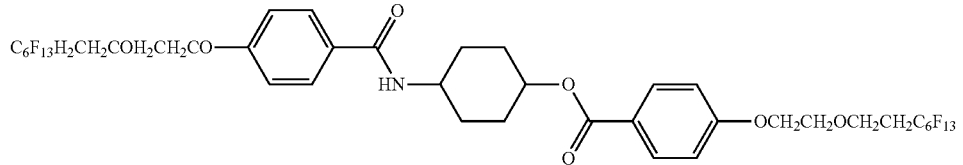
(13)
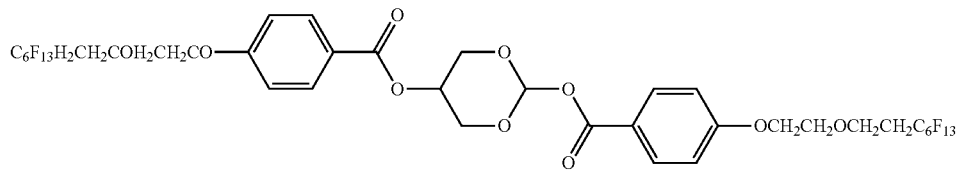
(14)
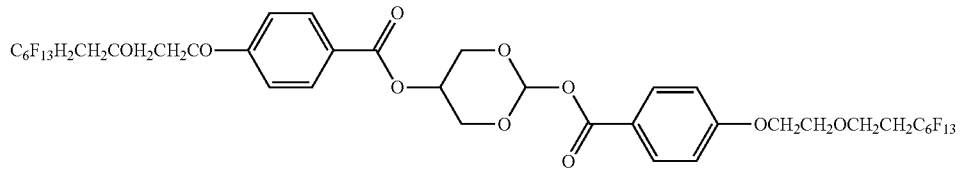
(15)
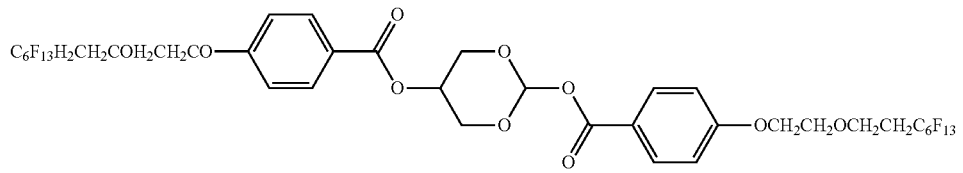
(16)
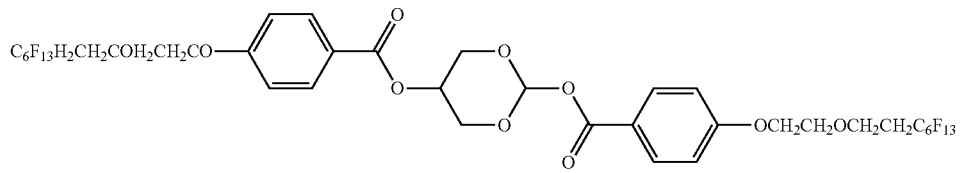
(17)
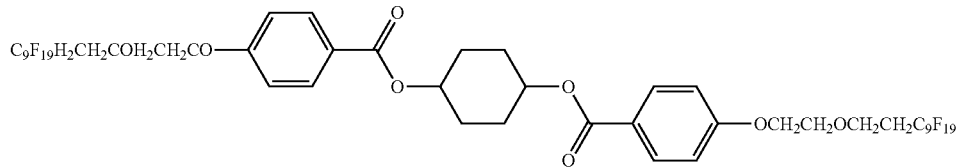
(18)
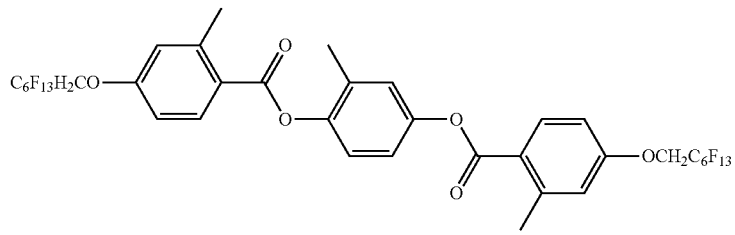
(19)

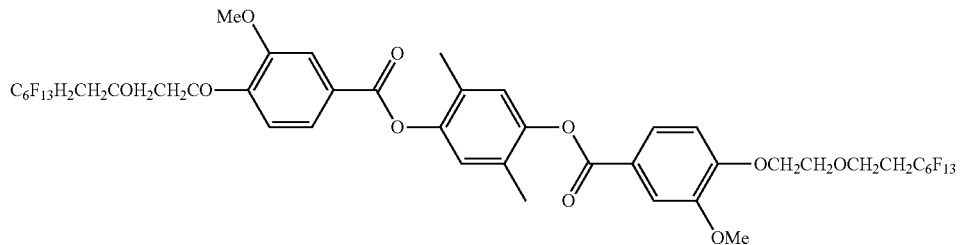
(20)
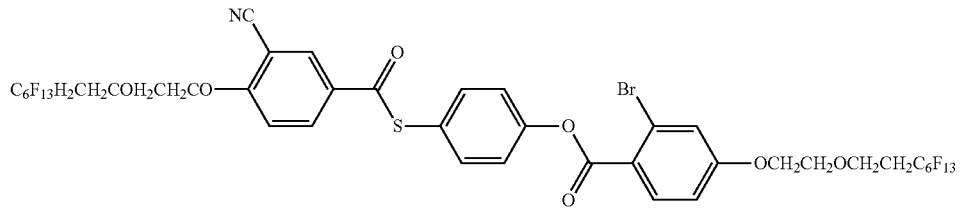
(21)
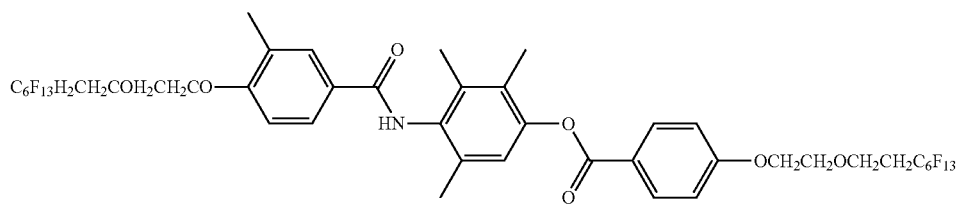
(22)
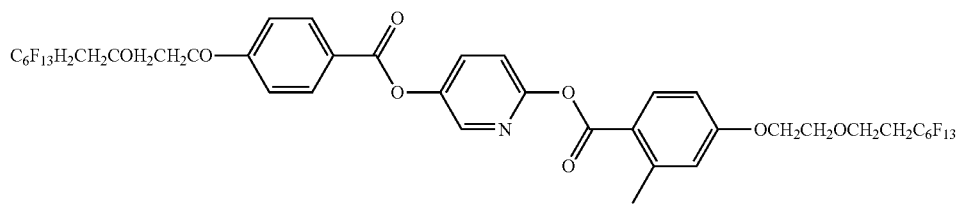
(23)
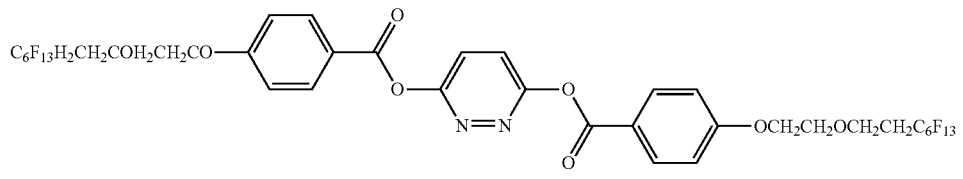
(24)
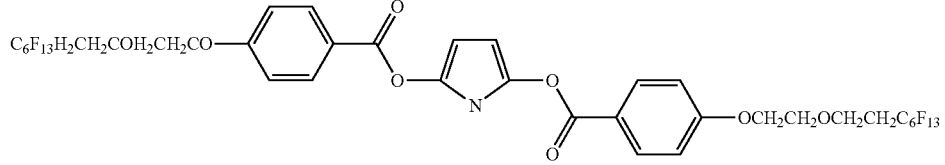
(25)
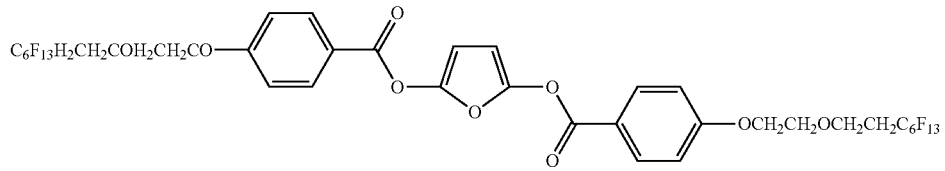
(26)
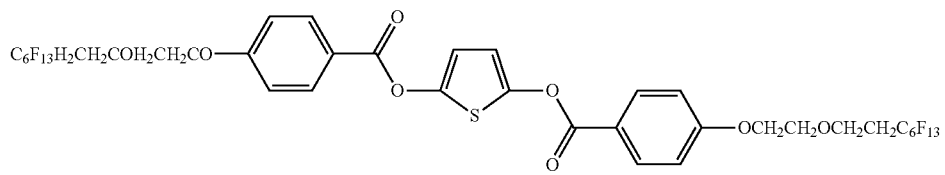
(27)

-continued
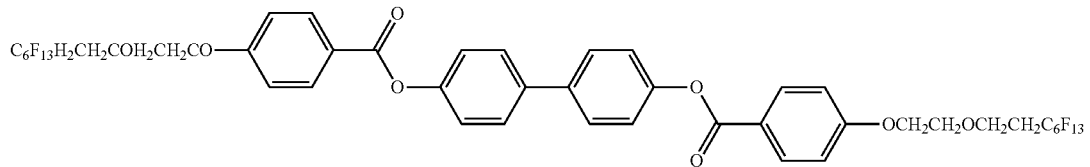
(28)
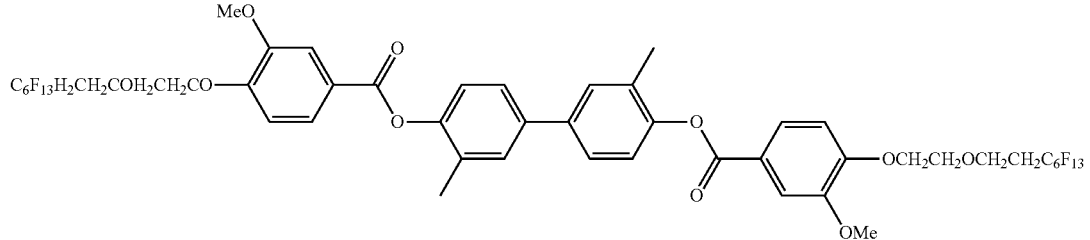
(29)
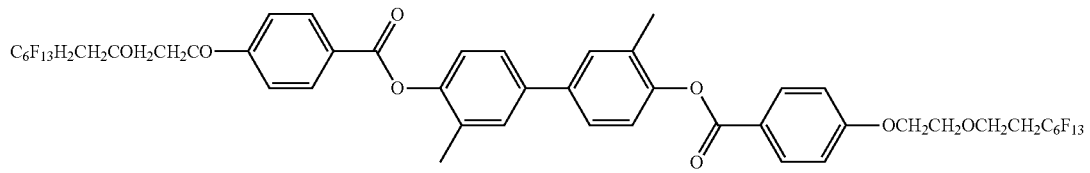
(30)
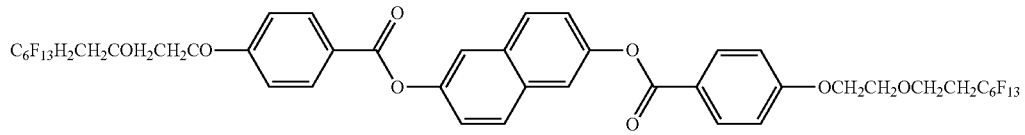
(31)
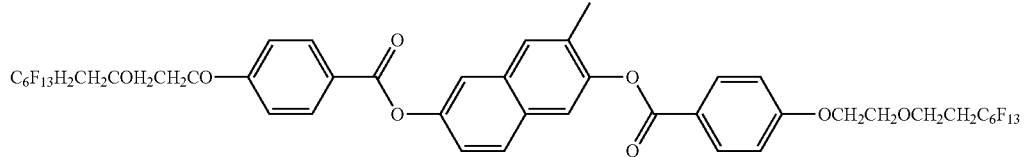
(32)
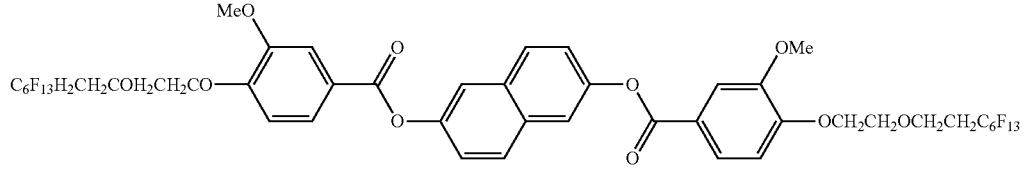
(33)
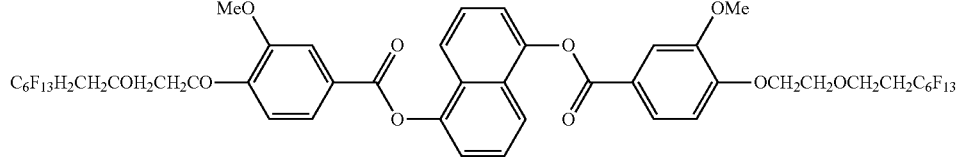
(34)
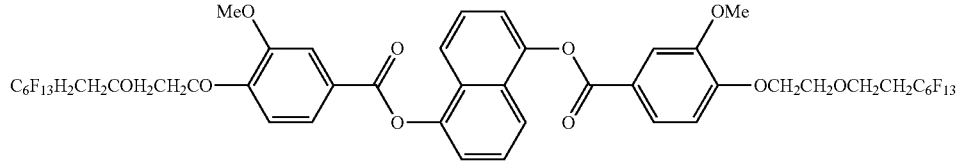
(35)

-continued
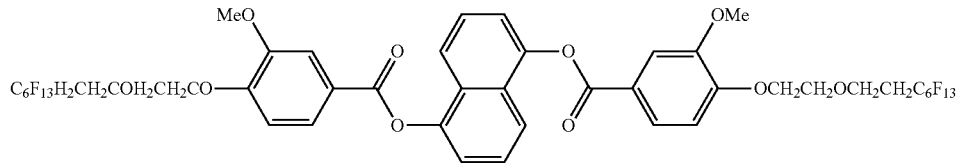
(36)
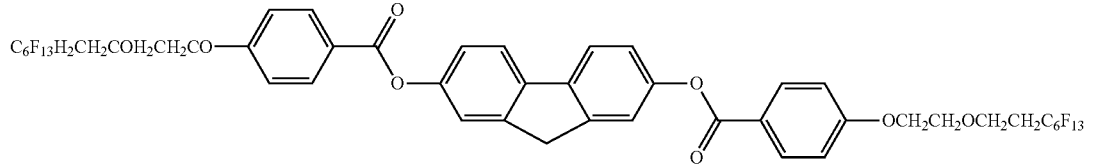
(37)
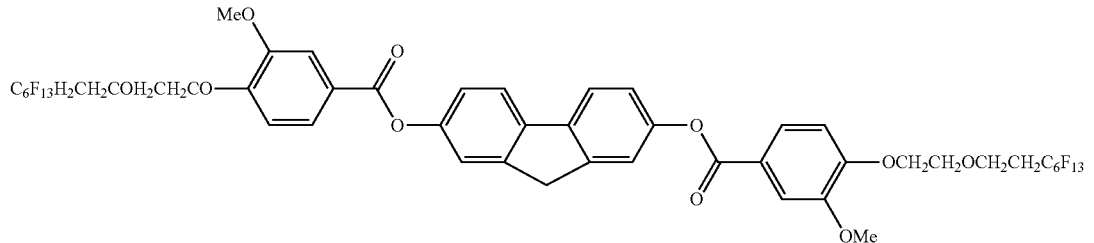
(38)
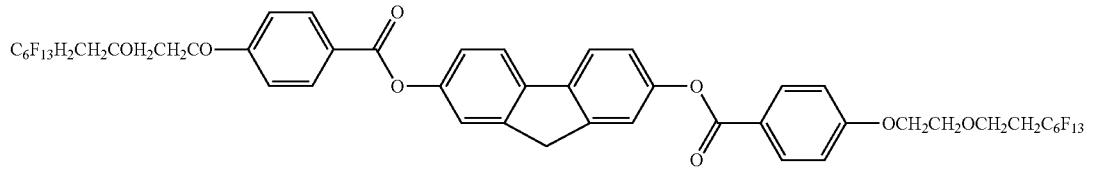
(39)
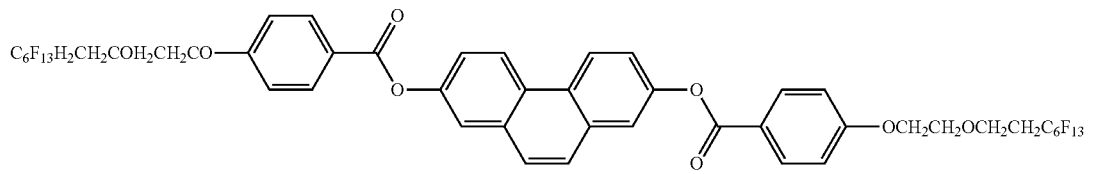
(40)
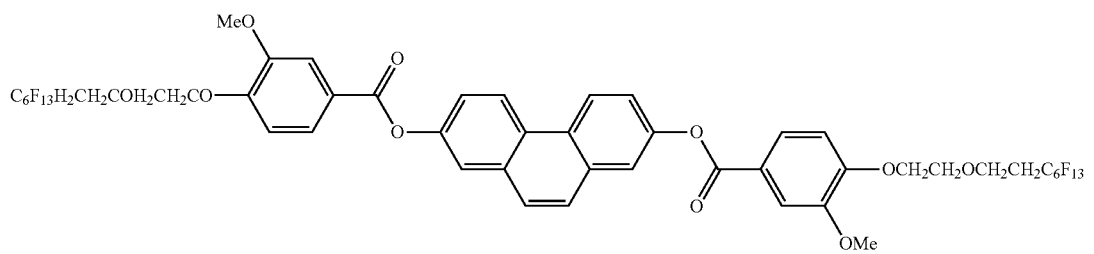
(41)
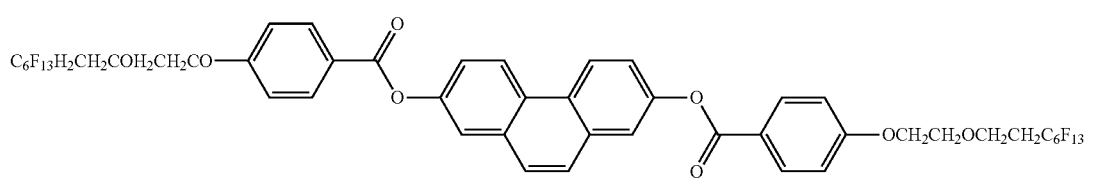
(42)

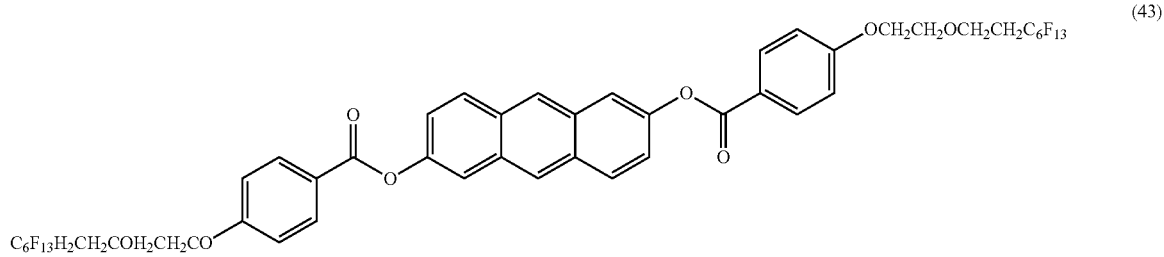
(43)
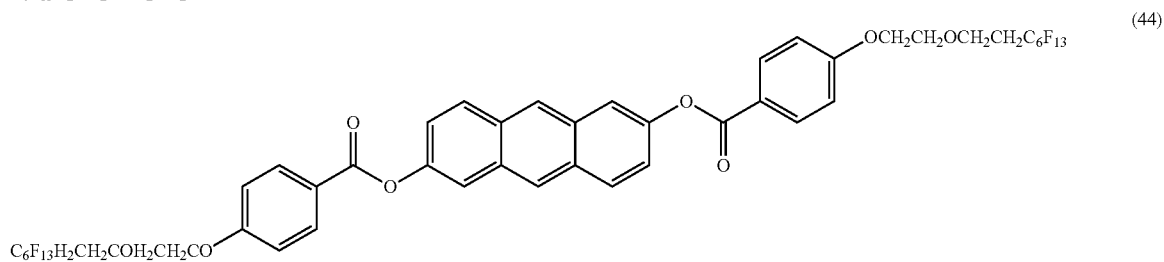
(44)
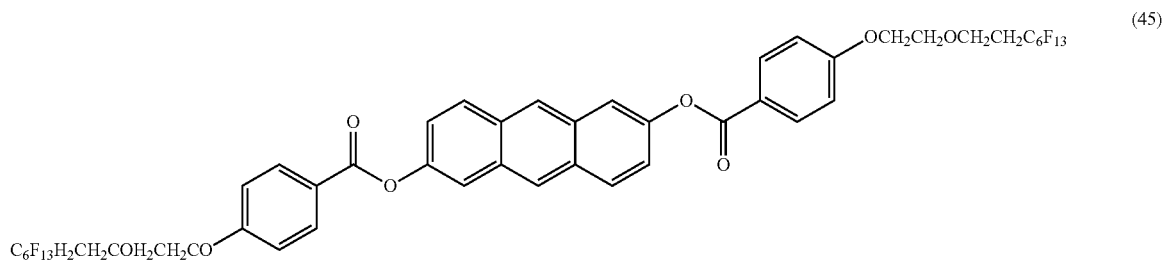
(45)
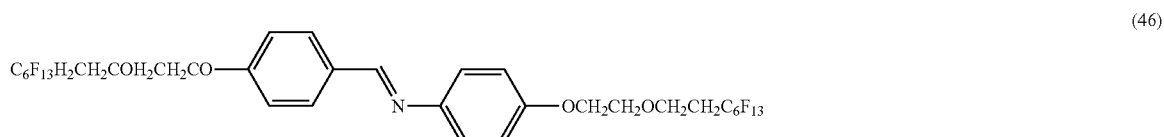
(46)
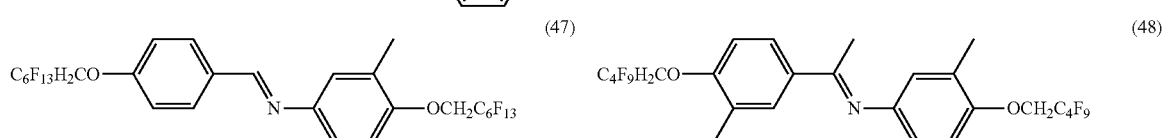
(47) (48)
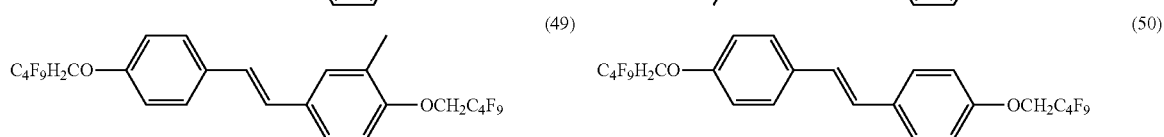
(49) (50)
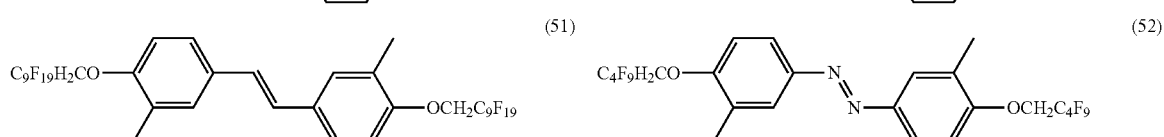
(51) (52)
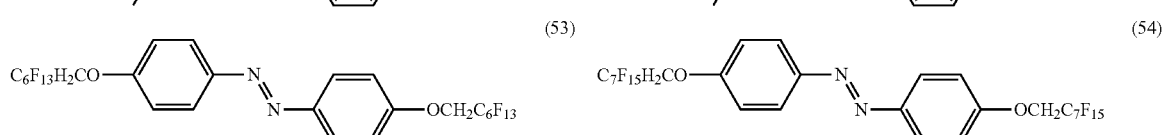
(53) (54)
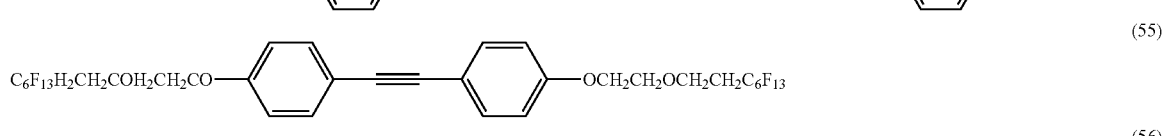
(55)
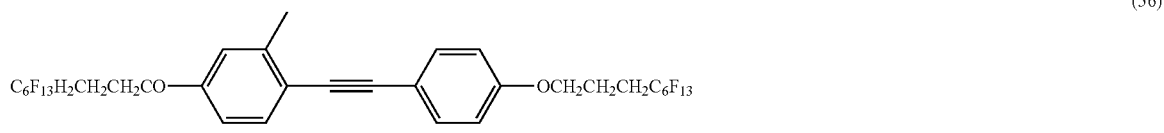
(56)

-continued
(57)
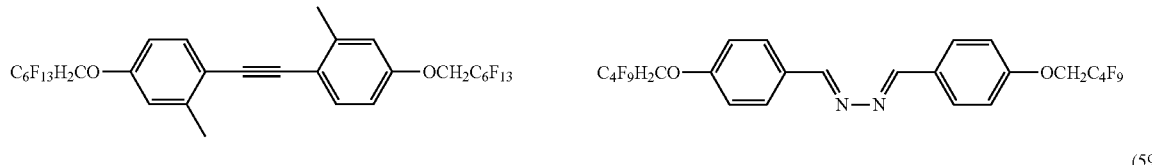
(58)
(59)
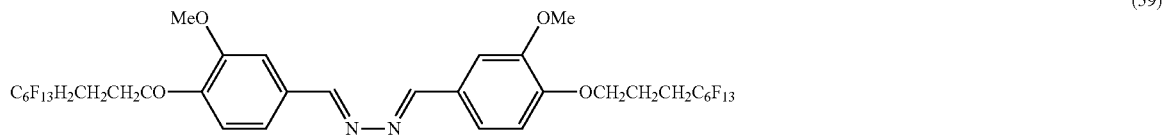
(60)
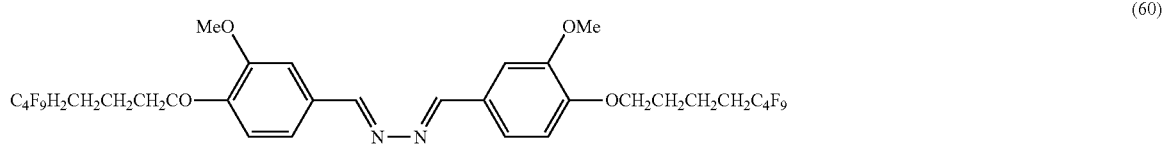
(61)
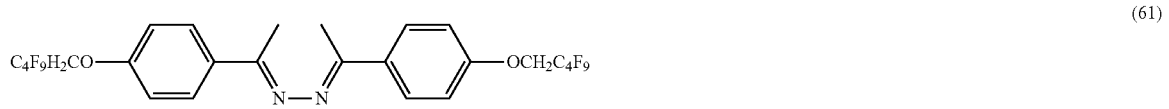
(62)
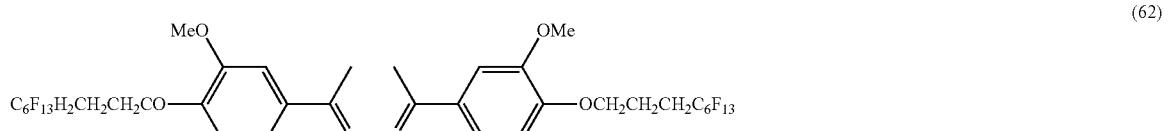
(63)
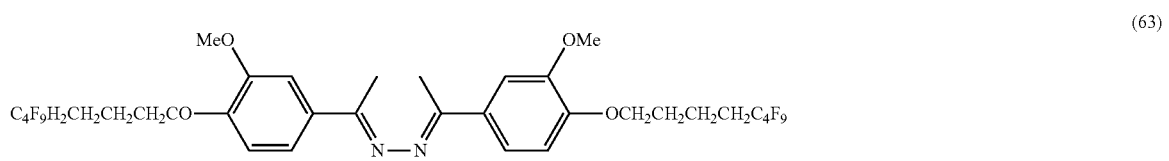
(64)
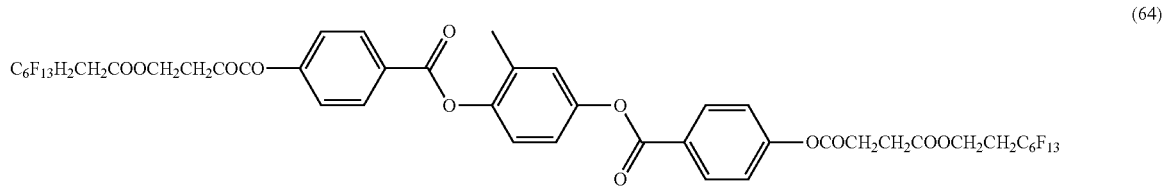
(65)
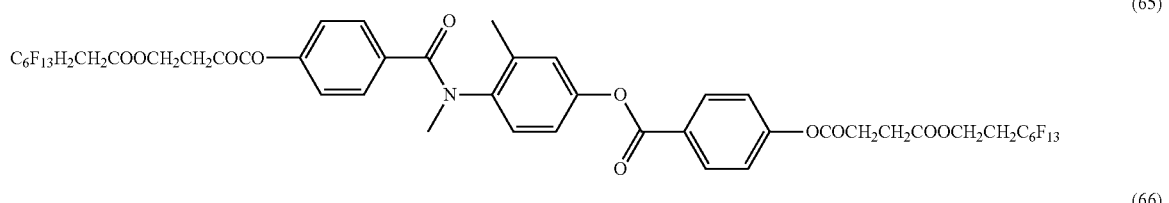
(66)
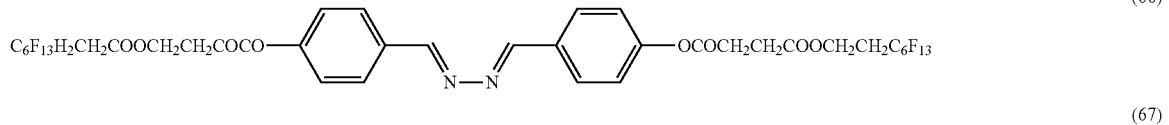
(67)
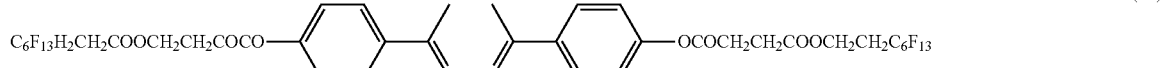
(68)
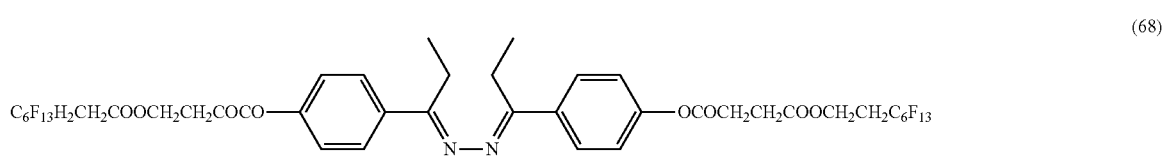

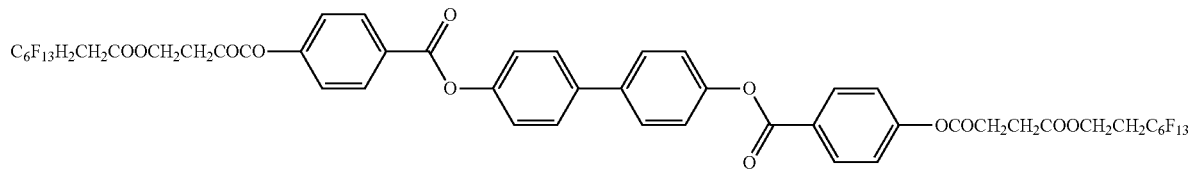

(69)

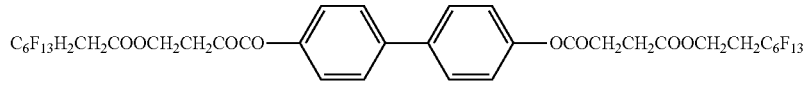

(70)

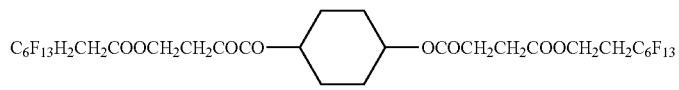

(71)

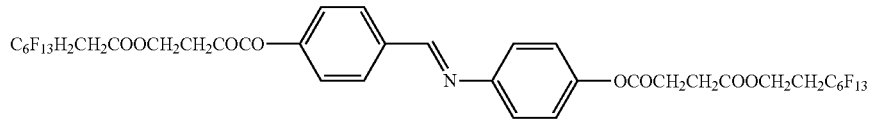

(72)

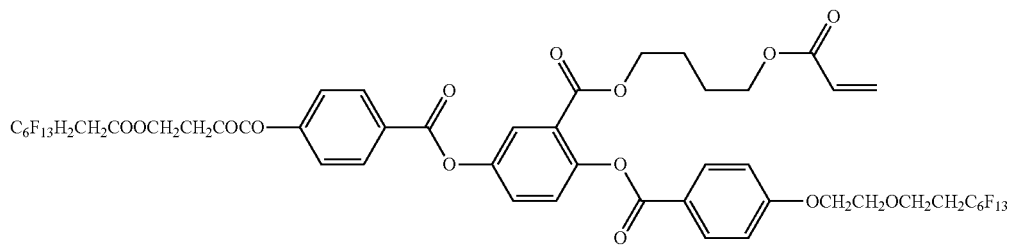

(73)

The compound represented by the formula (I) can be synthesized by appropriately selecting and combining the synthesizing methods described in JP-A-2002-129162, JP-A-2002-97170 or documents cited in the above publications. In addition, the compound can be synthesized by combining other well-known synthesizing methods as necessary.

[Liquid Crystalline Composition]

The liquid crystalline composition of the invention includes polymerizable liquid crystalline molecules and the compound represented by the formula (I). In the liquid crystalline composition of the invention, one or more kinds of polymerizable liquid crystalline molecules and one or more kinds of non-polymerizable liquid crystalline molecules may be jointly used. In addition, two or more of the compounds represented by the formula (I) may be used, and the compound represented by the formula (I) and another liquid crystal orientation promoter may be jointly used. The liquid crystal orientation promoter is preferably used in an amount of 0.01 mass % to 20 mass % of the amount of the liquid crystalline molecules. The use amount is preferably an amount of 0.1 mass % to 5 mass %. Discotic liquid crystalline molecules or rod-shaped liquid crystalline molecules are preferably used as the polymerizable liquid crystalline molecules.

The discotic liquid crystalline molecules are described in a variety of documents (C. Destrade et at., Mol. Crysr. Liq. Cryst., Vol. 71, page 111 (1981); Quarterly Chemical Review by the Chemical Society of Japan No. 22, Chemistry of Liquid Crystals, Chapter 5, Section 2 of Chapter 10 (1994); B. Kohne et al., Angew. Chem. Soc. Chem. Comm., page 1794 (1985); J. Zhang et al., J. Am. Chem. Soc., vol. 116, page 2655 (1994)). The polymerization of the discotic liquid crystalline molecules is described in JP-A-8-27284. In order to fix the discotic liquid crystalline molecules through polymerization, it is necessary to bond a polymerizable group to a discotic core of the discotic liquid crystalline molecules as a substituent. However, when a polymerizable group is directly bonded to the discotic core, it becomes difficult to hold the orientation state in a polymerization reaction. Therefore, a linking group is introduced between the discotic core and the polymerizable group. Therefore, the discotic liquid crystalline molecule having a polymerizable group is preferably a compound represented by the following formula.

D(-L-Q)$n$

In the above formula, D represents the discotic core; L represents a divalent linking group; Q represents a polymerizable group; and n represents an integer of 4 to 12. Specific examples of the discotic core (D) in the above formula will be illustrated below. In the following specific examples, LQ (or QL) represents a combination of the divalent linking group (L) and the polymerizable group (Q). Among the following specific examples, triphenylene (D4) is particularly preferable.

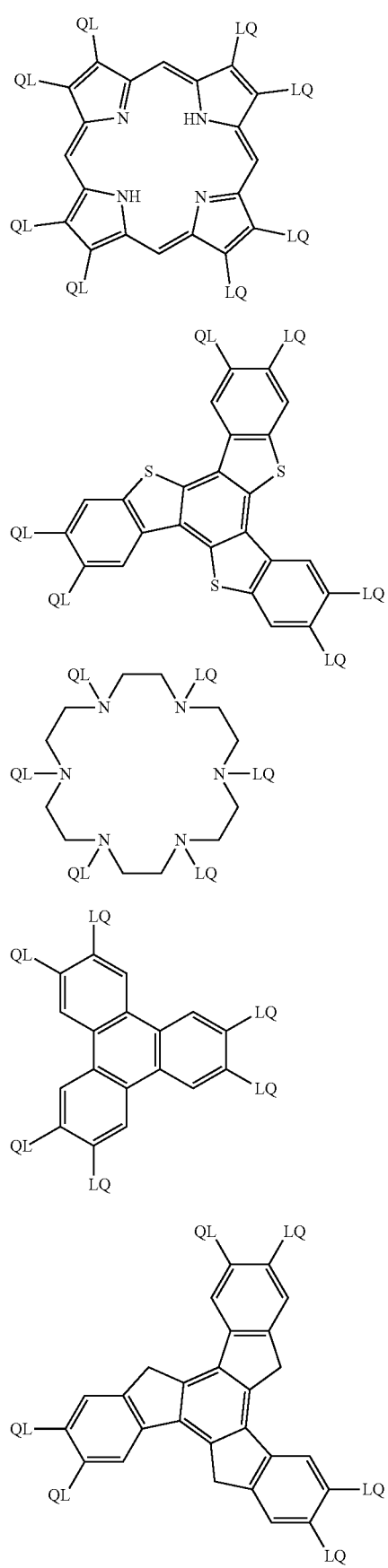
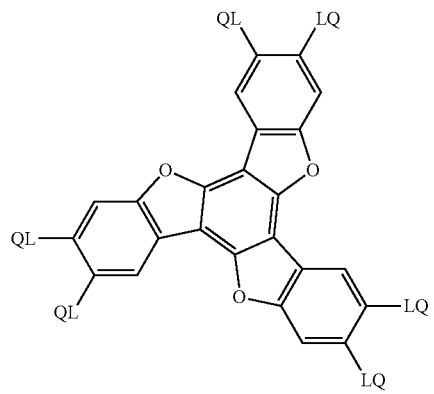
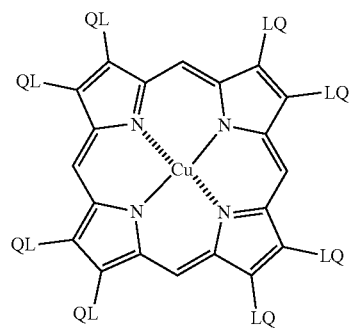
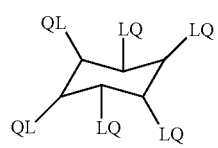
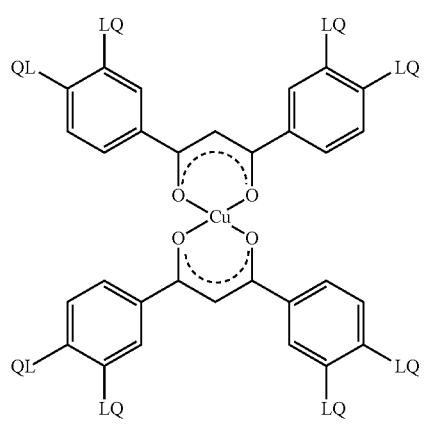

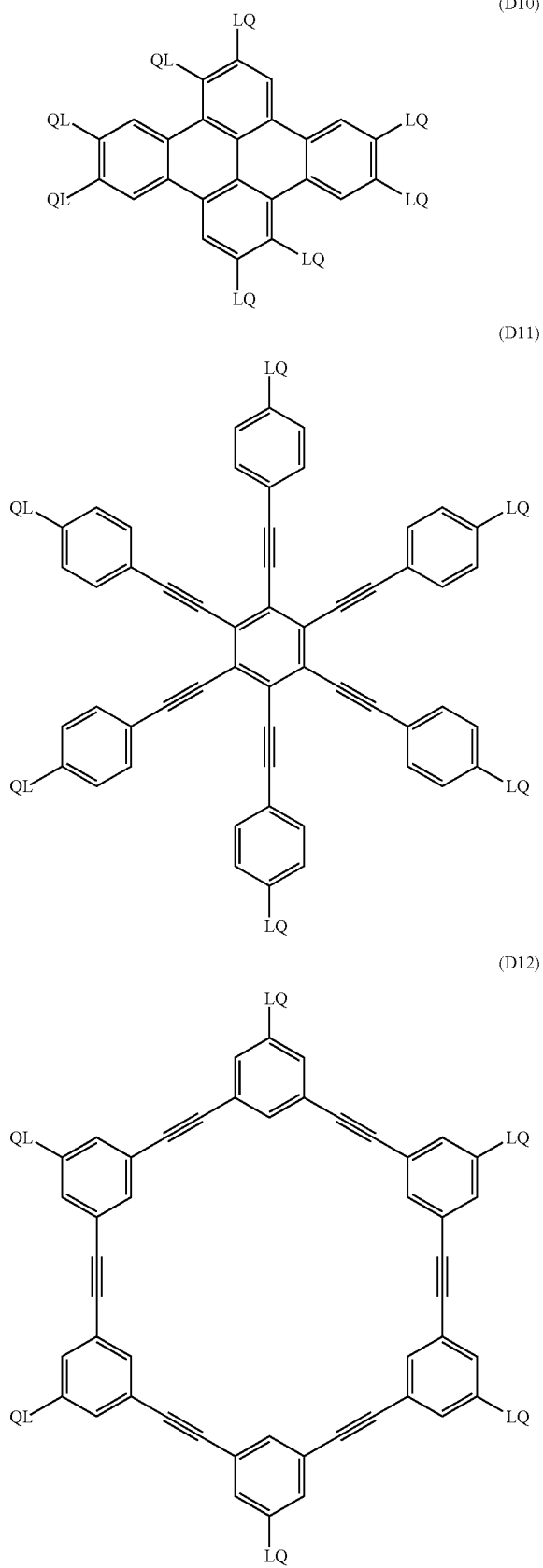
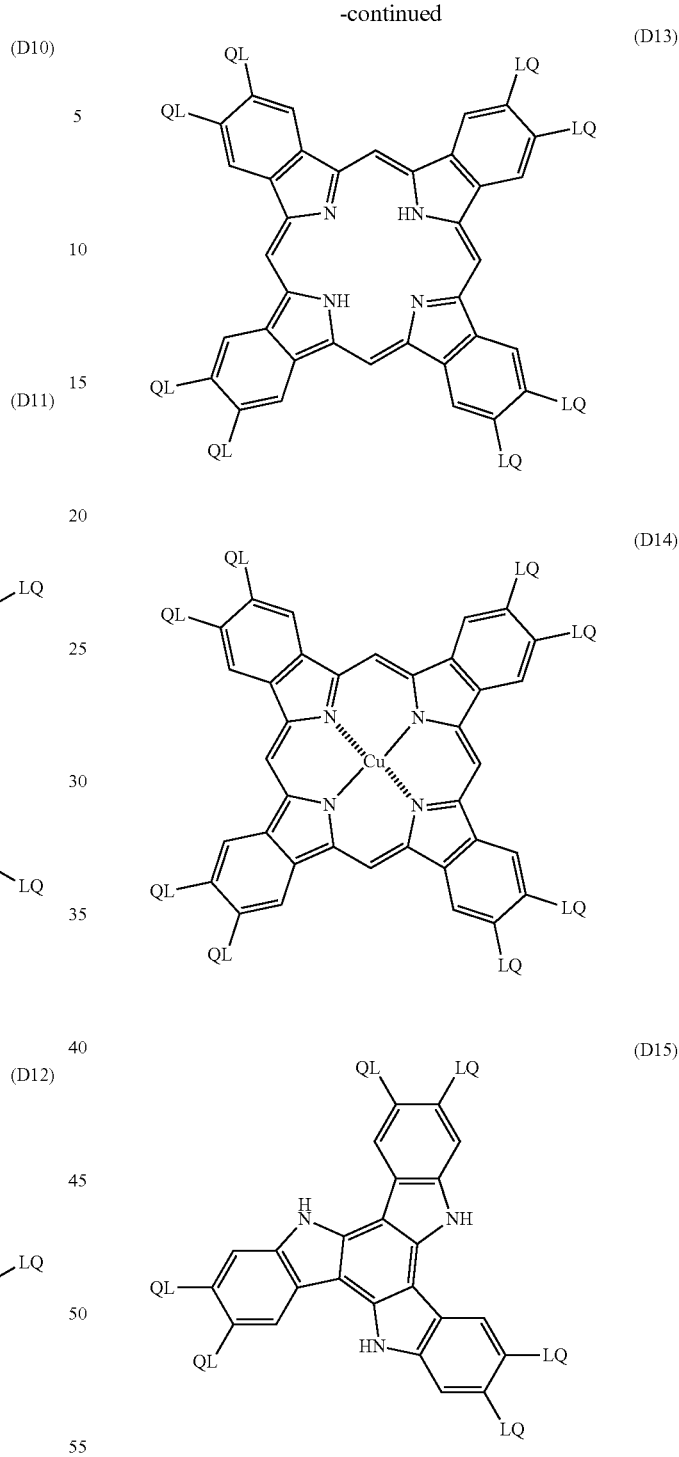

Regarding the detail and preferable range of the linking group L or the polymerizable group Q, [0161] to [0171] of JP-A-2002-129162 can be referenced.

As the polymerizable rod-shaped liquid crystalline molecules, azomethines, azoxys, cyanobiphenyls, cyanophenyl esters, benzoic acid esters cyclohexane carboxylic acid phenyl esters, cyanophenyl cyclohexanes, cyano-substituted phenylpyrimidines, alkoxy-substituted phenylpyrimidines, phenyldioxanes, tolans and alkenyl cyclohexyl benzonitriles are preferably used.

The birefringence of the polymerizable rod-shaped liquid crystalline molecules is preferably 0.001 to 0.7. Regarding specific examples of the polymerizable group, [0169] of JP-A-2002-129162 can be referenced. The rod-shaped liquid crystalline molecules preferably have a molecular structure that is almost symmetric with respect to the short-axis direction. In order to have such a molecular structure, the rod-shaped liquid crystalline molecules preferably have polymerizable groups at both ends of the rod-shaped molecular structure. Hereinafter, specific examples of the rod-shaped liquid crystalline molecules will be illustrated.

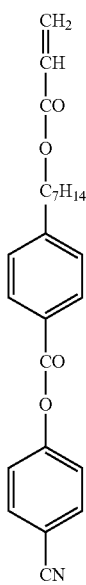
(N1)

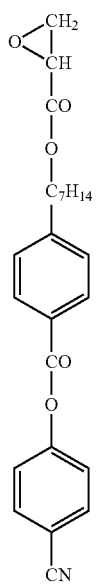
(N2)

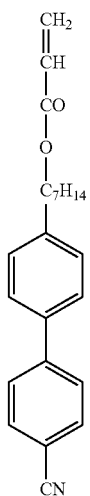
(N3)

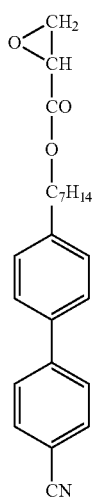
(N4)

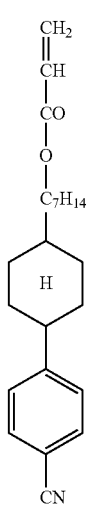
(N5)

(N6)
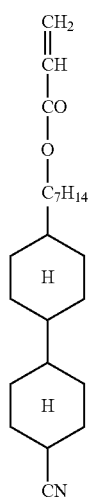
(N7)
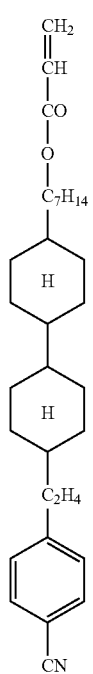
(N8)
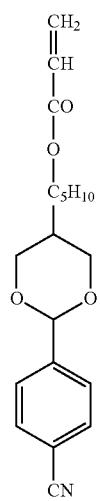
(N9)
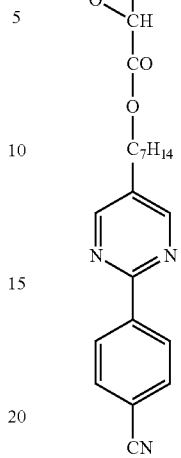
(N10)
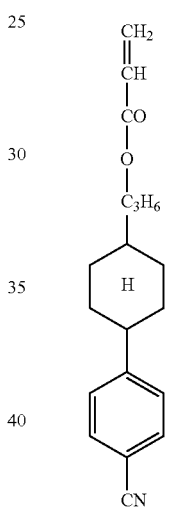
(N11)
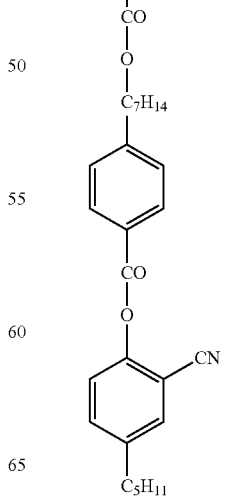

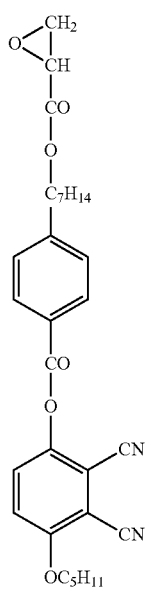
(N12)
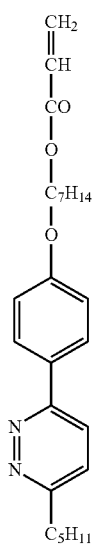
(N13)
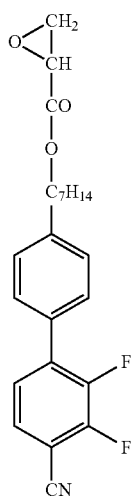
(N14)
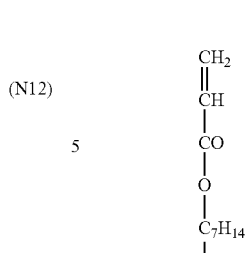
(N15)
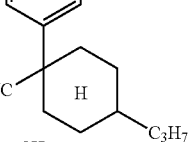
(N16)
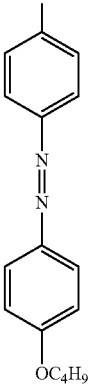
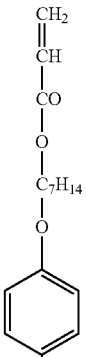
(N17)
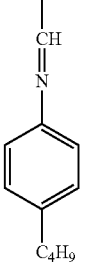

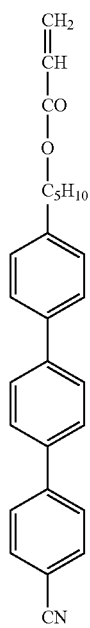
(N18)
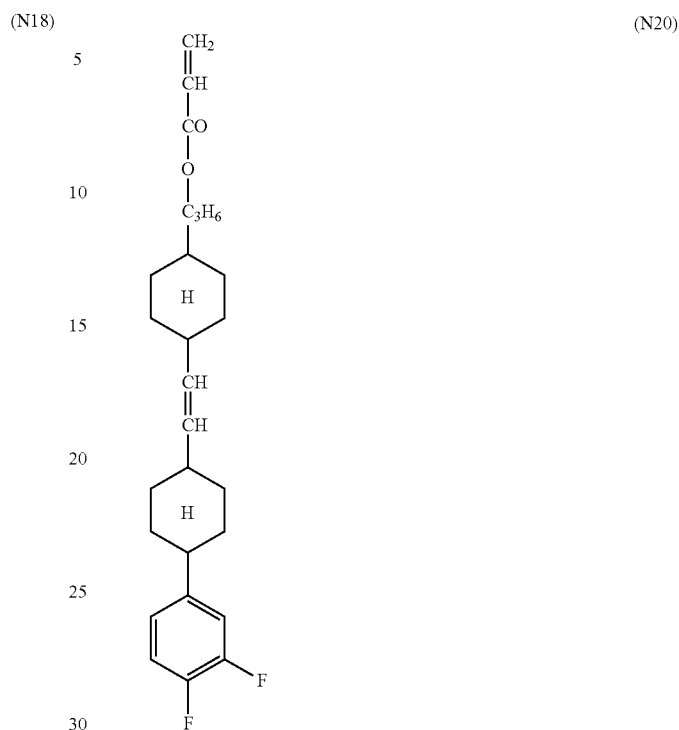
(N20)
(N19)
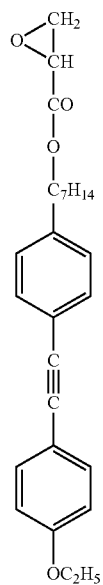
(N21)

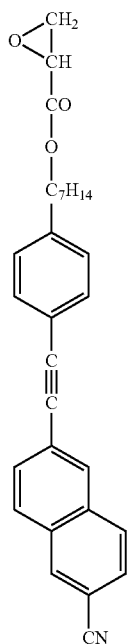
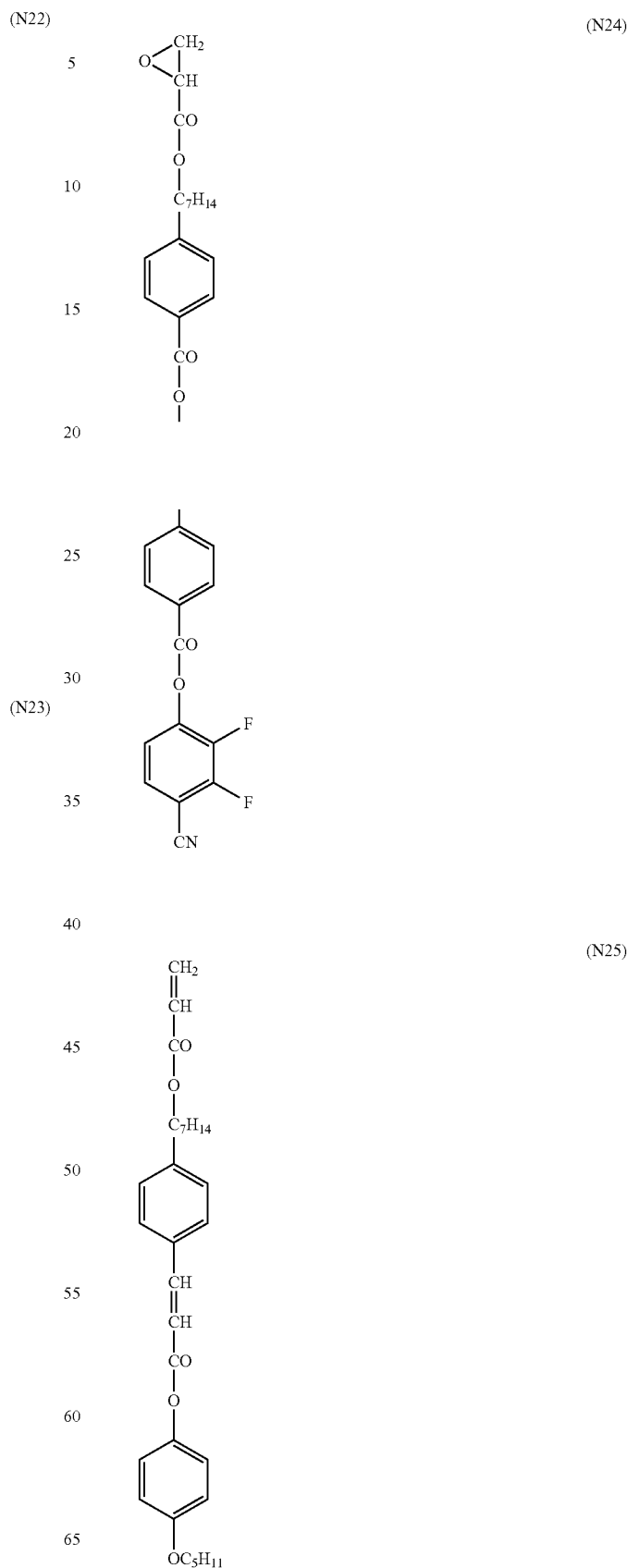

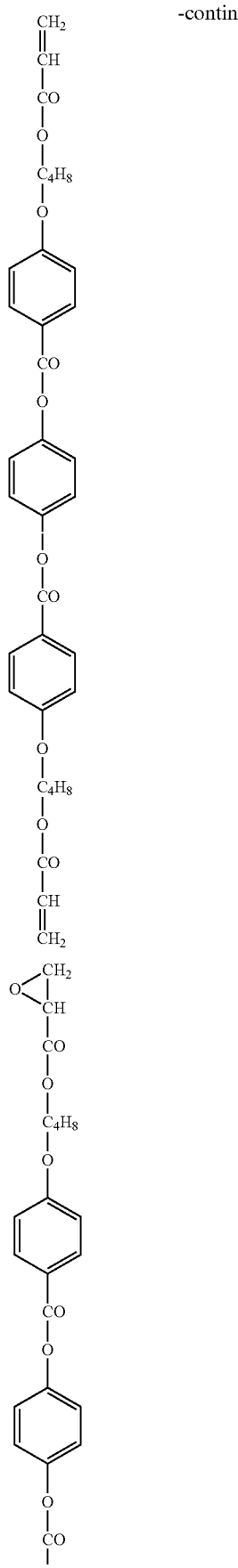
(N26)
(N27)
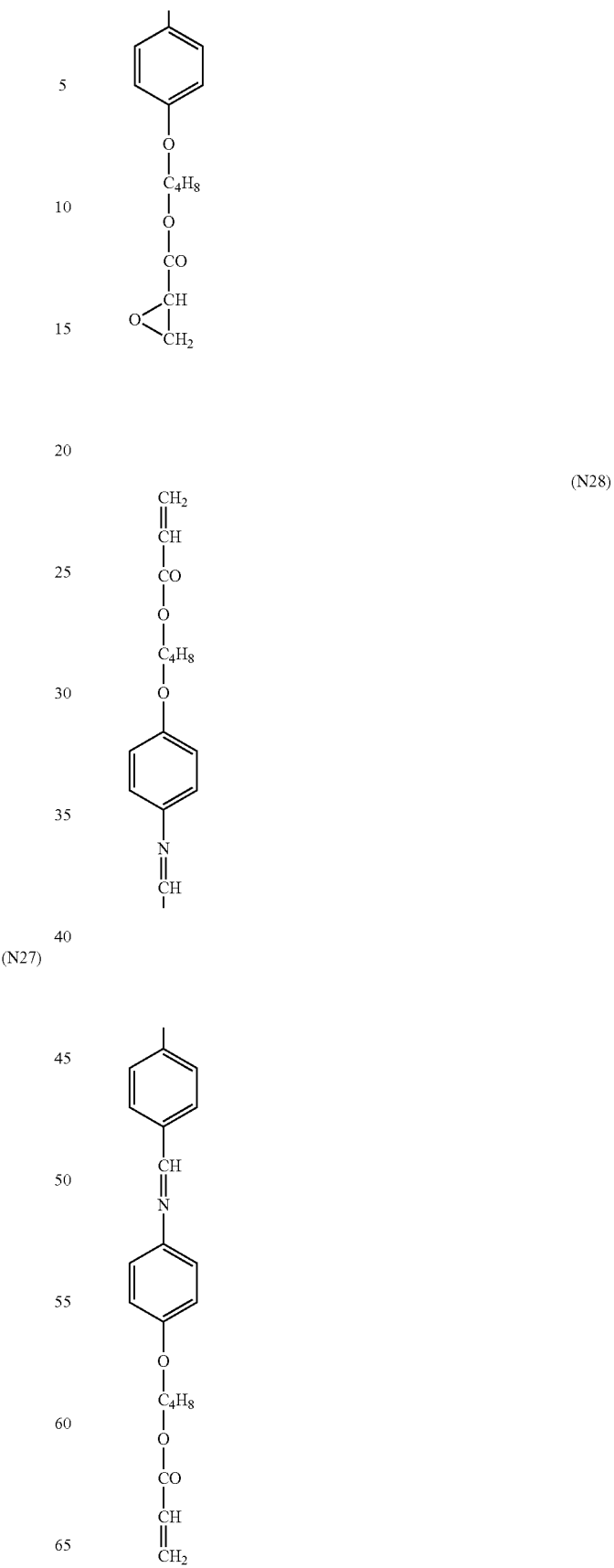
(N28)

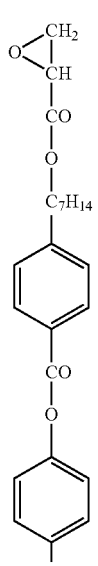
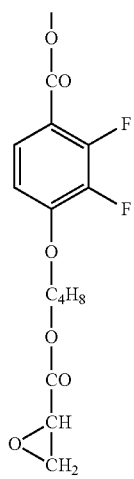
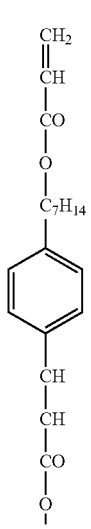
(N29)
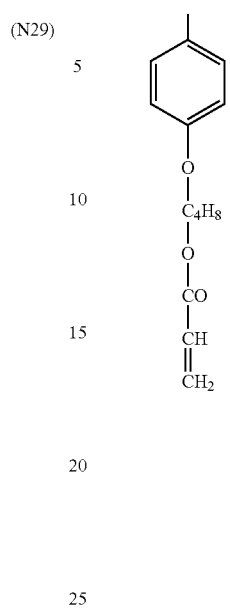
(N30)
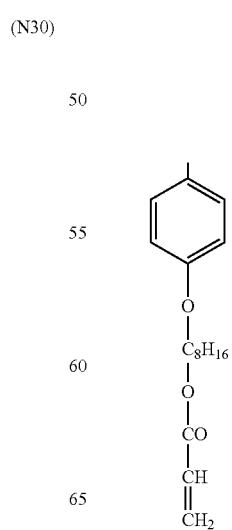
(N31)

(N32)
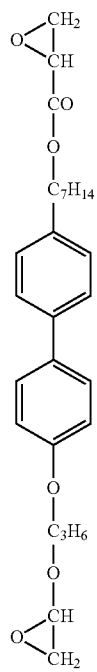
(N34)
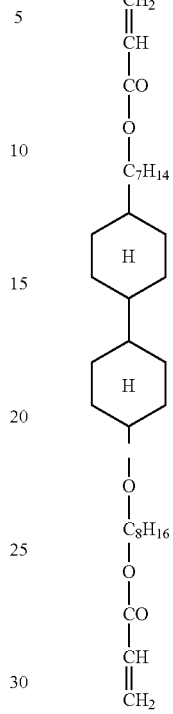
(N33)
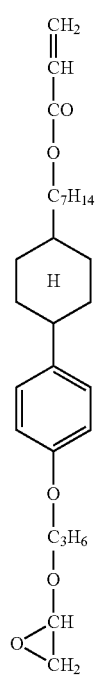
(N35)
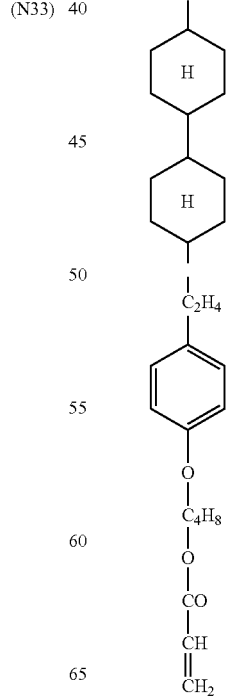

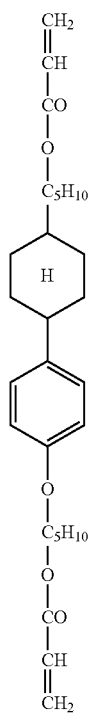
(N36)
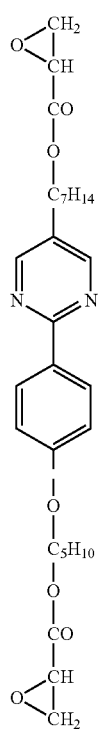 (N37)
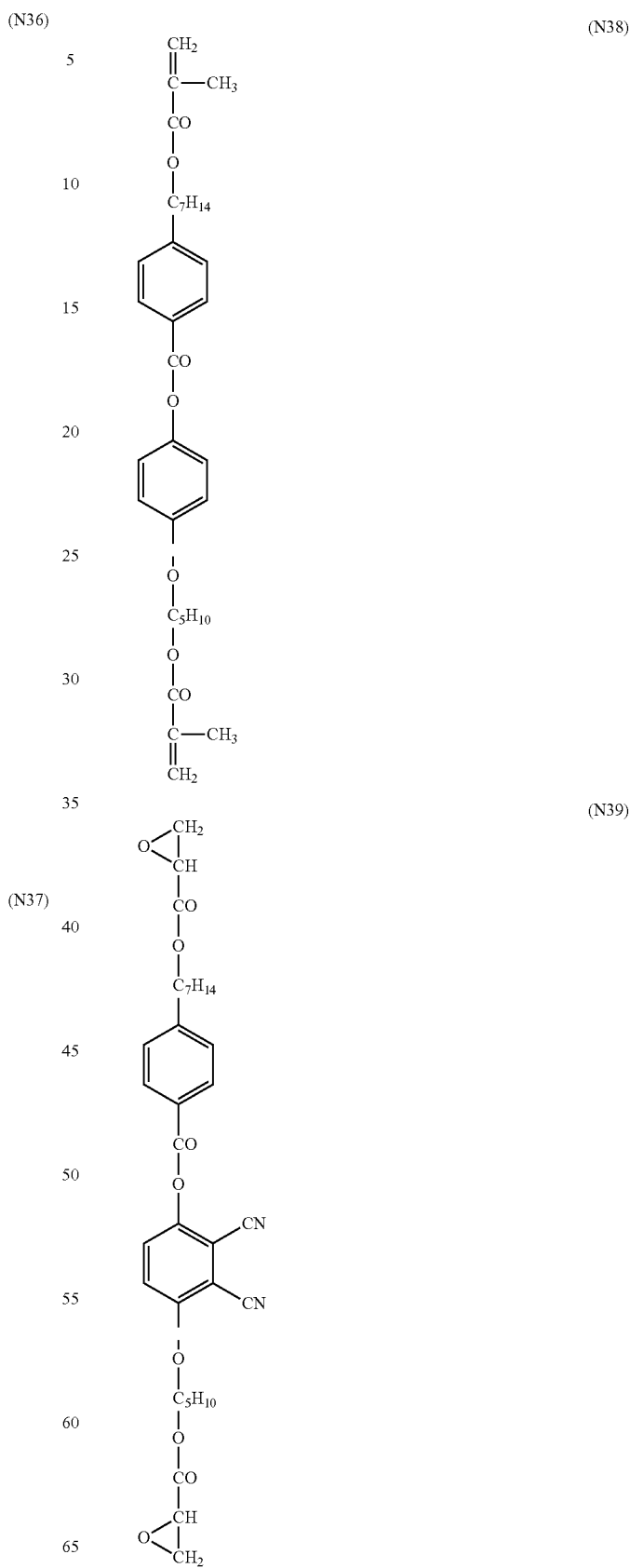

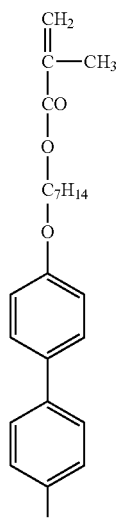
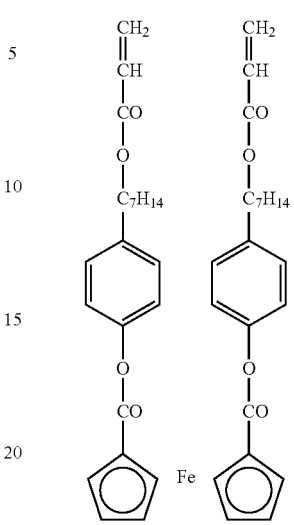

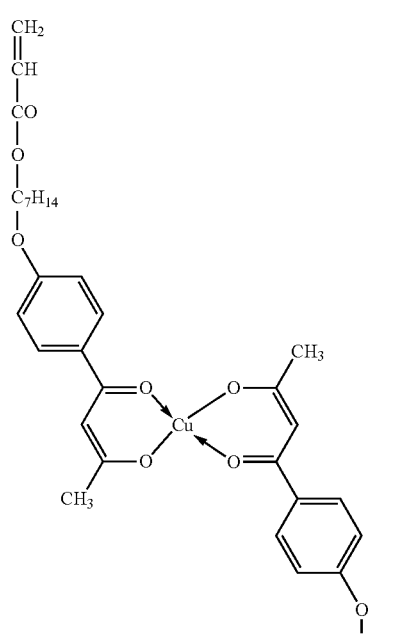
(N44)
(N45)
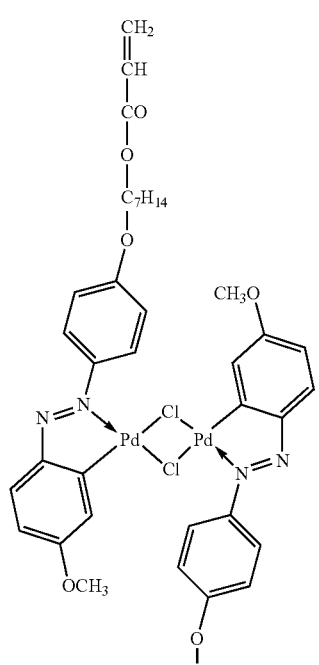
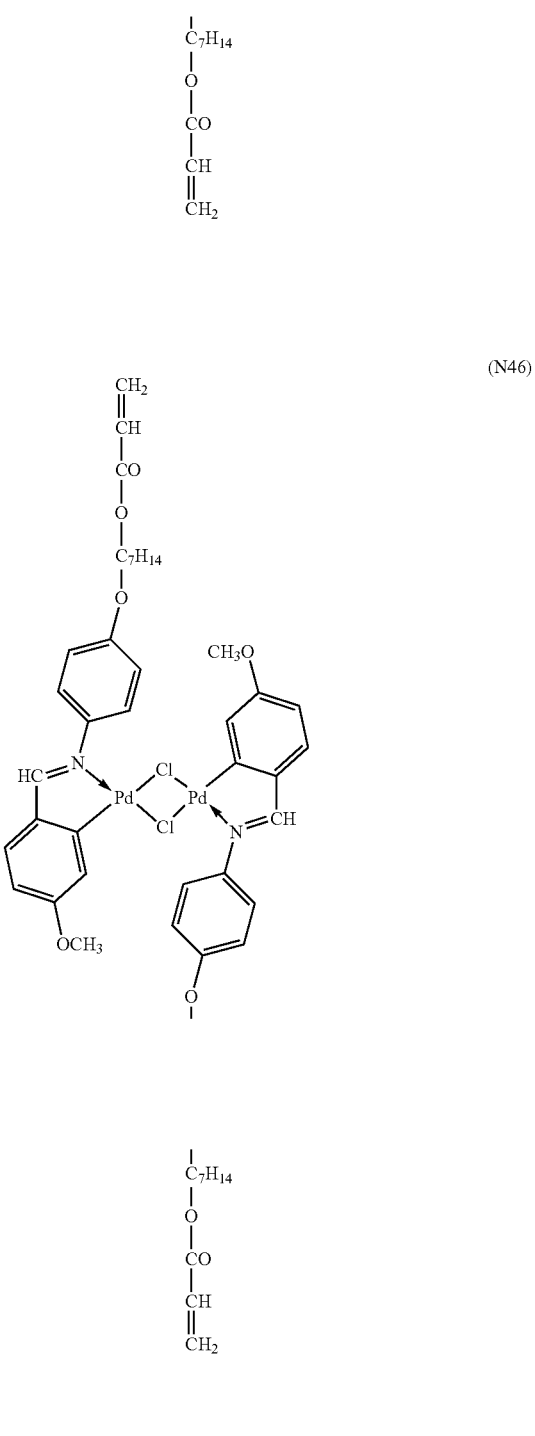
(N46)
(N47)

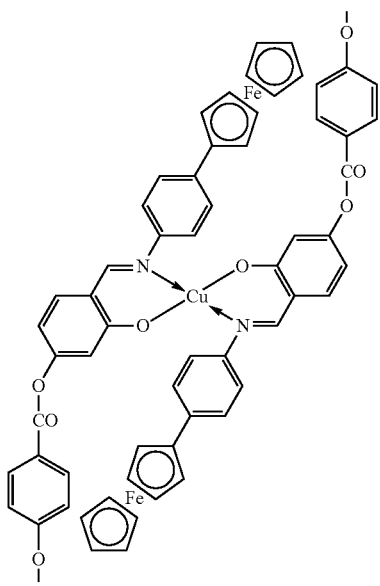
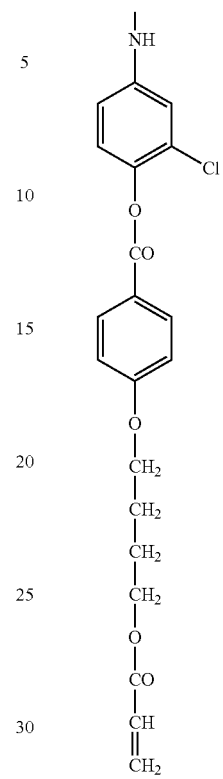
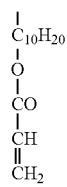
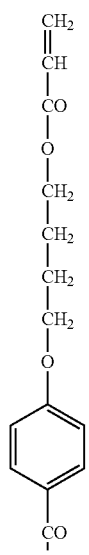
(N48)
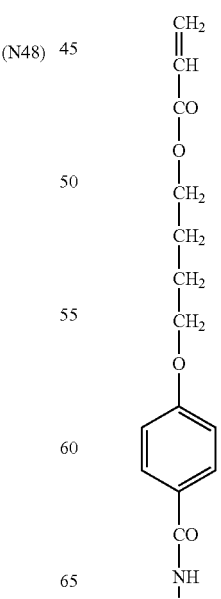
(N49)

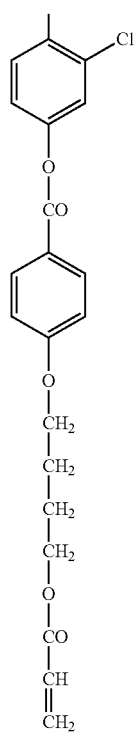
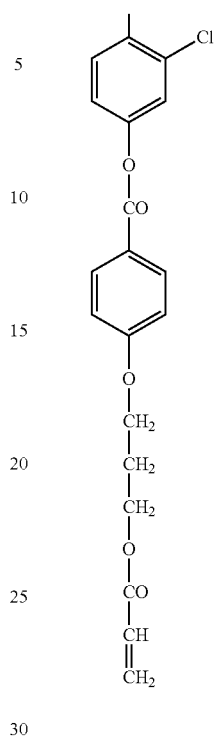
(N50)
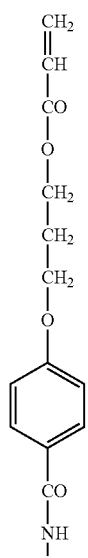
(N51)
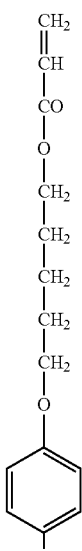

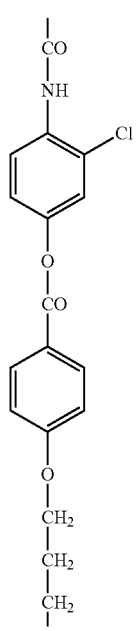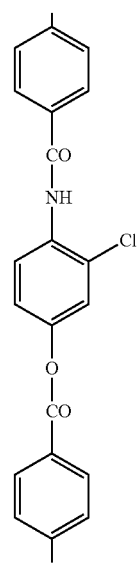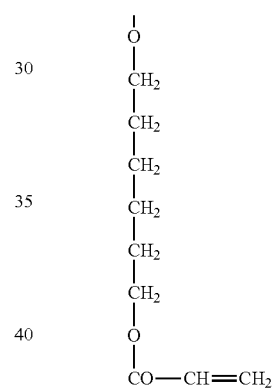
(N52)
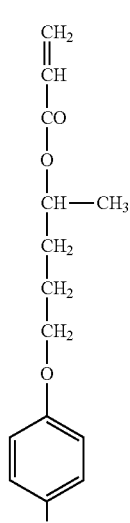
(N53)

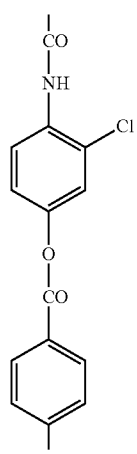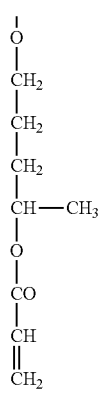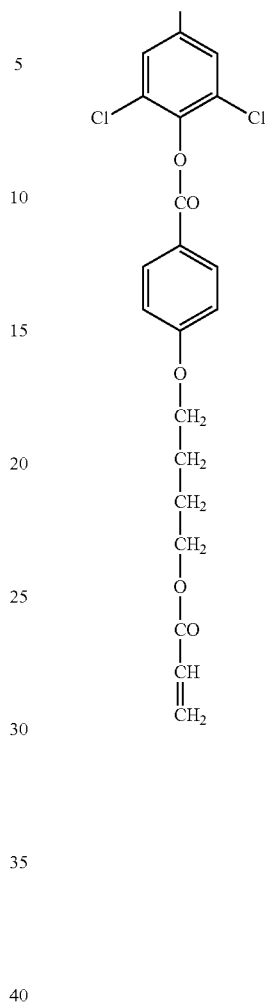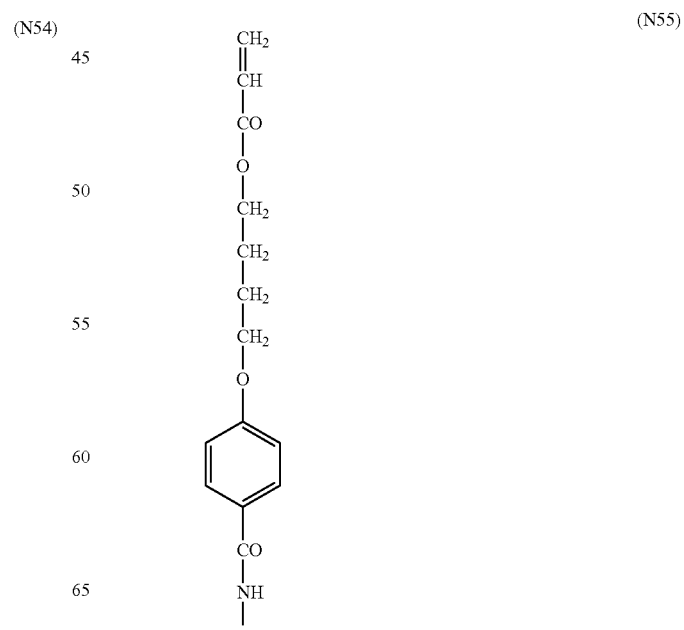

61
-continued
62
-continued
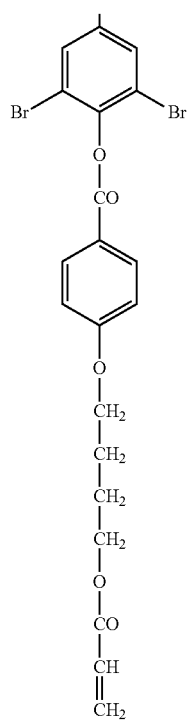
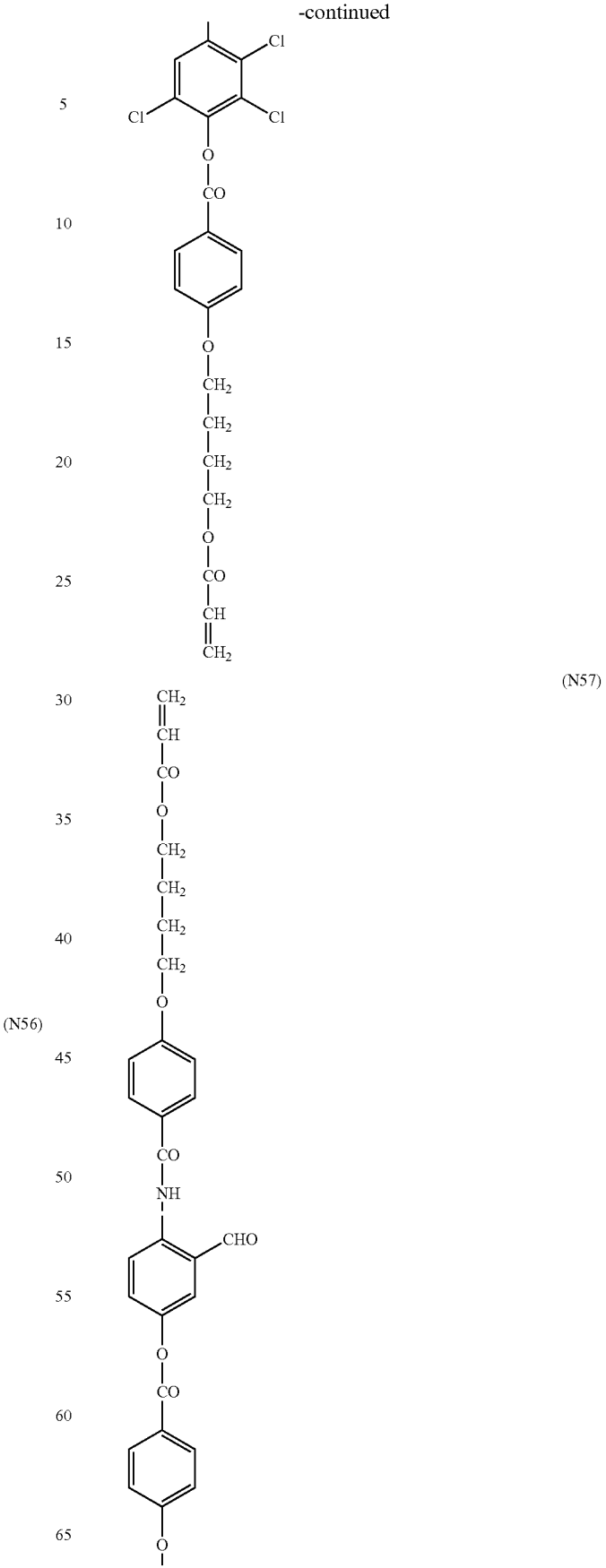
(N56)
(N57)

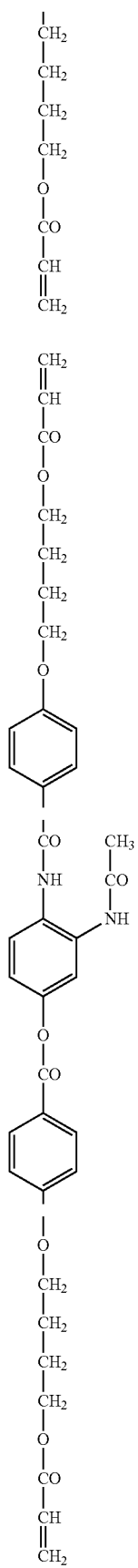
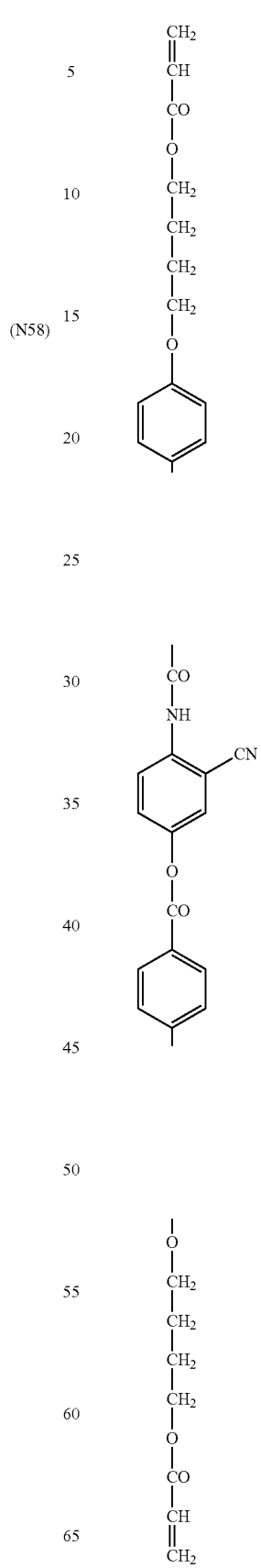

(N60)
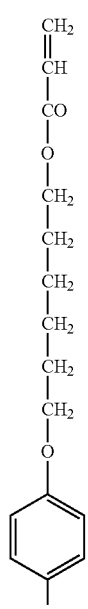
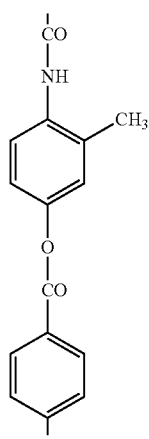
(N61)
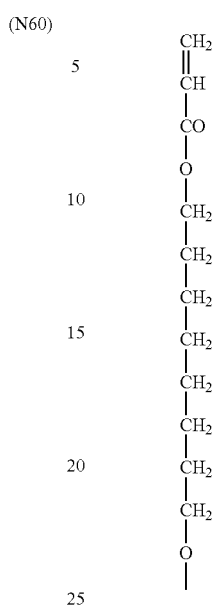
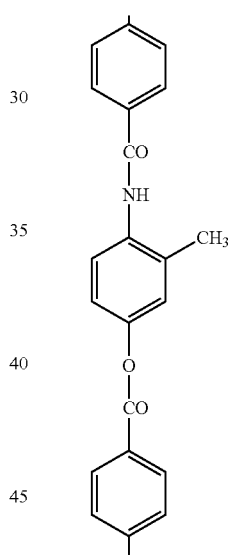
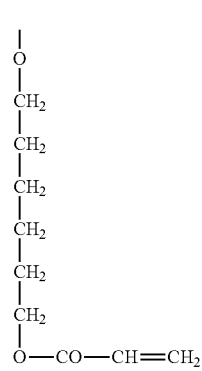
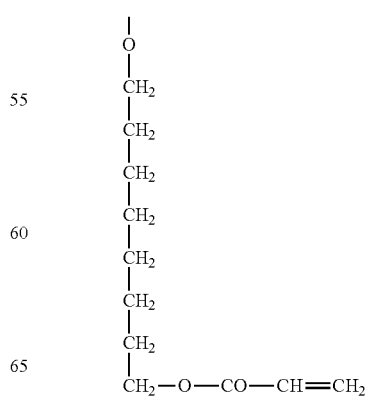

(N62)
(N63)
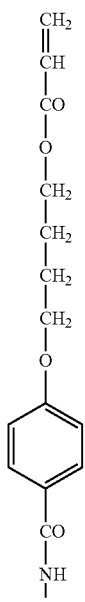
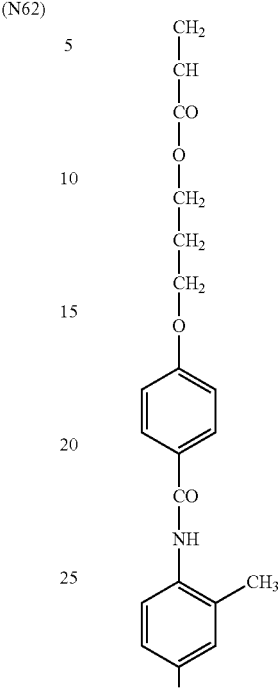
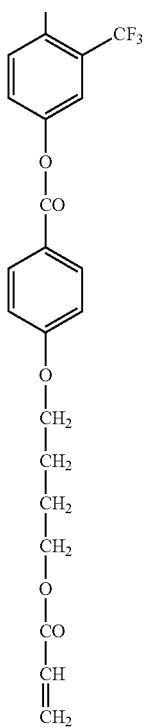

(N64)
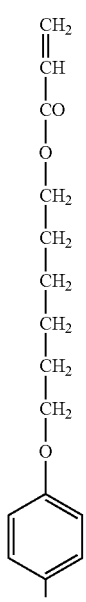
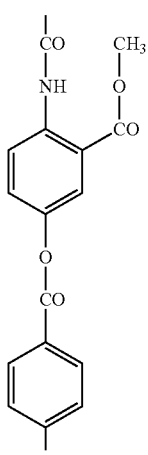
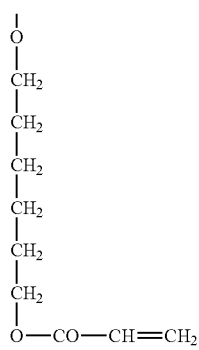
(N65)
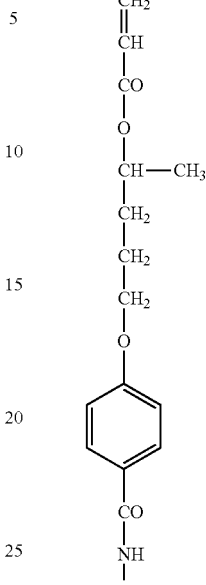
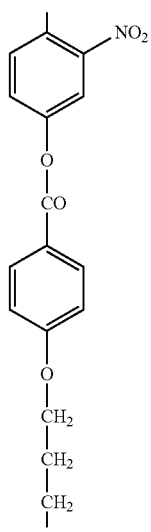
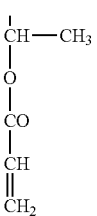

(N66)
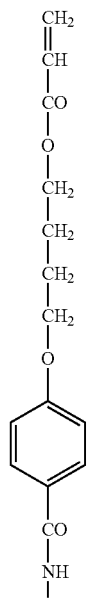
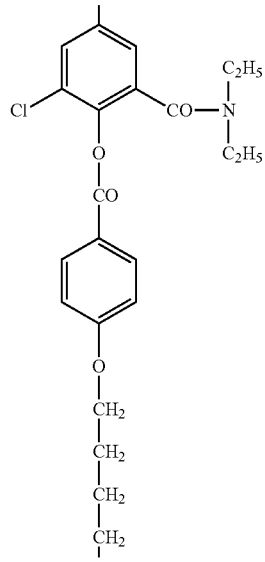
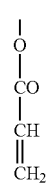
(N67)
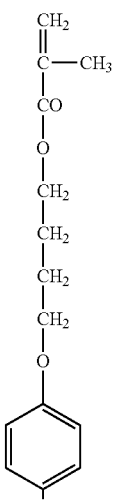
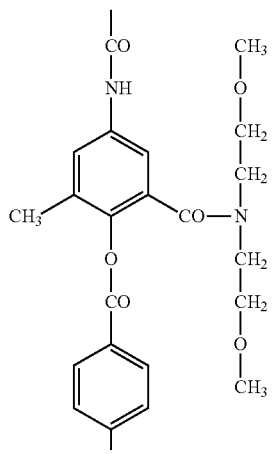
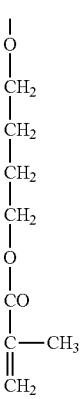

(N68)
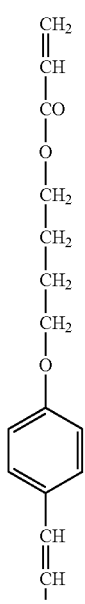
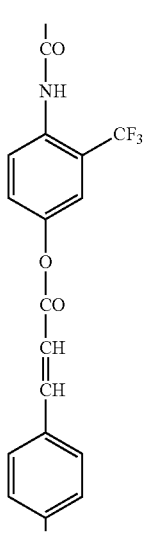
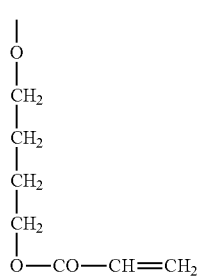
(N69)
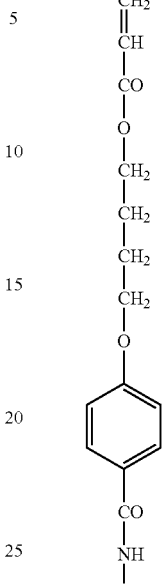
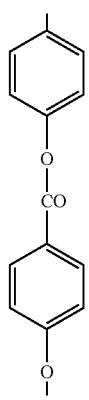
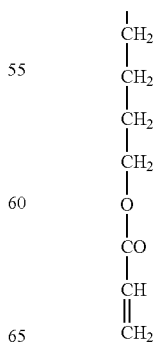

(N70)
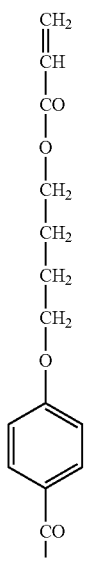
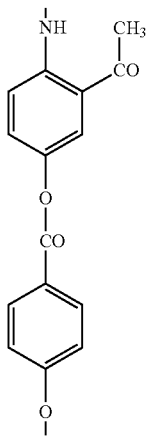
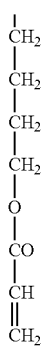
(N71)
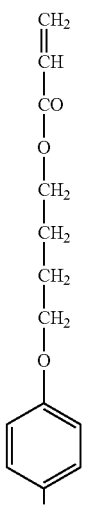
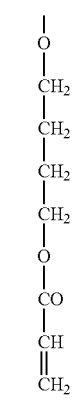

(N72)

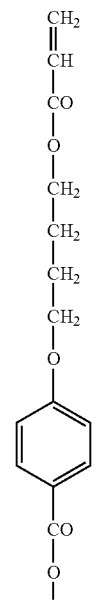

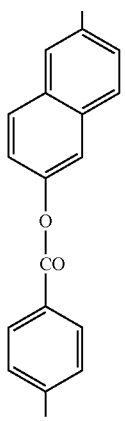

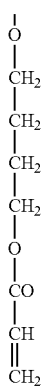

(N73)

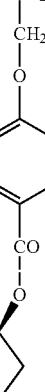

The liquid crystalline composition can include a solvent, a compound including an asymmetric carbon atom, a polymerization initiator (described below) or other additives (for example, cellulose esters) as necessary in addition to the polymerizable liquid crystalline molecules and the liquid crystal orientation promoter. An organic solvent is preferably used as the solvent for the liquid crystalline composition. Examples of the organic solvent include amides (for example, N,N-diemthylformamide), sulfoxides (for example, dimethyl sulfoxide), hetero ring compounds (for example, pyridine), hydrocarbons (for example, benzene and hexane), alkyl halides (for example, chloroform and dichloromethane), esters (for example, methyl acetate and butyl acetate), ketones (for example, acetone and methyl ethyl ketone) and ethers (for example, tetrahydrofuran and 1,2-dimethoxyethane). Alkyl halides and ketones are preferable. Two or more organic solvents may be jointly used.

[Film]

It is possible to form a film by manufacturing a film using a method such as coating of a liquid crystalline composition including the compound represented by the formula (I). It is also possible to produce an optically anisotropic element by coating a liquid crystalline composition on an oriented film and forming a liquid crystalline layer.

The liquid crystalline composition can be coated using a well-known method (for example, an extrusion coating method, a direct gravure coating method, a reverse gravure coating method, a die coating method or a bar coating method). The liquid crystalline molecules are preferably fixed while maintaining the orientation state. The liquid crystalline molecules are preferably fixed using a polymerization reaction of the polymerizable group (Q) introduced into the liquid crystalline molecules. Examples of the polymerization reaction include a thermopolymerization reaction in which a thermopolymerization initiator is used and a photopolymerization reaction in which a photopolymerization initiator is used. The photopolymerization reaction is preferable. Examples of the photopolymerization initiator include α-carbonyl compounds (described in the respective specifications of U.S. Pat. No. 2,367,661 and U.S. Pat. No. 2,367,670), acyloin ethers (described in the specification of U.S. Pat. No. 2,448,828), α-hydrocarbon-substituted aromatic acyloin compounds (described in the specification of U.S. Pat. No. 2,722,512), polynuclear quinone compounds (described in the respective specifications of U.S. Pat. No. 3,046,127 and U.S. Pat. No. 2,951,758), combinations of triaryl imidazole dimer and p-aminophenyl ketone (described in the specification of U.S. Pat. No. 3,549,367), acridine and phenazine compounds (described in the specifications of JP-A-60-105667 and U.S. Pat. No. 4,239,850), oxadiazole compounds (described in the specification of U.S. Pat. No. 4,212,970), and acylphosphine oxide compounds (described in JP-B-63-40799, JP-B-5-29234, JP-A-10-95788 and JP-A-10-29997).

The use amount of the photopolymerization initiator is preferably 0.01 mass % to 20 mass %, and more preferably 0.5 mass % to 5 mass % of the solid content of a coating fluid. Ultraviolet rays are preferably used for light radiation for polymerizing the discotic liquid crystalline molecules. The radiation energy is preferably 20 mJ/cm$^2$ to 50 J/cm$^2$, and more preferably 100 mJ/cm$^2$ to 800 mJ/cm$^2$. In order to promote the photopolymerization reaction, light radiation may be carried out under heating conditions. The thickness of the liquid crystalline layer is preferably 0.1 µM to 50 µm, more preferably 1 µM to 30 µm, and most preferably 5 µm to 20 µm. The coating amount of the liquid crystal orientation promoter in the liquid crystalline layer is preferably 0.005 g/m$^2$ to 0.5 g/m$^2$, more preferably 0.01 g/m$^2$ to 0.45 g/m$^2$, still more preferably 0.02 g/m$^2$ to 0.4 g/m$^2$, and most preferably 0.03 g/m$^2$ to 0.35 g/m$^2$.

[Oriented Film]

The oriented film can be provided using means such as a rubbing treatment of an organic compound (preferably a polymer), oblique deposition of an inorganic compound, formation of a layer having microgrooves or accumulation of an organic compound (for example, ω-tricosanoic acid, dioctadecyl methyl ammonium chloride or methyl stearate) using a Langmuir Blodgett method (LB film). Furthermore, oriented films in which an orientation function is generated by supply of an electric field, supply of a magnetic field or radiation of light are also known. An oriented film formed using a rubbing treatment of a polymer is particularly preferable. The rubbing treatment is carried out by rubbing the surface of a polymer layer with paper or fabric in a certain direction several times. The kind of the polymer used in the oriented film is determined depending on the orientation of the liquid crystalline molecules (particularly an average inclination angle). In order to orient the liquid crystalline molecules horizontally (average inclination angle: 0° to 50°), a polymer that does not decrease the surface energy of the oriented film (an ordinary polymer for the oriented film) is used. In order to orient the liquid crystalline molecules vertically (average inclination angle: 50° to 90°), a polymer that decreases the surface energy of the oriented film is used. In order to decrease the surface energy of the oriented film, it is preferable to introduce a hydrocarbon group having 10 to 100 carbon atoms into a side chain of the polymer.

The kinds of specific polymers are described in documents regarding optical compensation sheets in which liquid crystalline molecules corresponding to a variety of display modes are used. The thickness of the oriented film is preferably 0.01 µm to 5 µm, and more preferably 0.05 µm to 1 µm. Meanwhile, the liquid crystalline layer may be transferred onto a transparent support after orienting the liquid crystalline molecules in an optically anisotropic layer using the oriented film. The liquid crystalline molecules fixed in an oriented state can maintain the oriented state without the oriented film. In addition, in the case of an orientation having an average inclination angle of less than 5°, it is not necessary to carry out the rubbing treatment, and the oriented film is not required either. However, an oriented film that forms a chemical bond with the liquid crystalline molecules at an interface (described in JP-A-9-152509) may be used for the purpose of improving adhesion between the liquid crystalline molecules and the transparent support. In a case in which the oriented film is used for the purpose of adhesion improvement, the rubbing treatment may not be carried out. In a case in which two kinds of liquid crystalline layers are provided on the same side of the transparent support, it is also possible to make the liquid crystalline layer formed on the transparent support function as the oriented film for the liquid crystalline layer provided thereon.

[Transparent Support]

The film of the invention or an optically anisotropic element having the film of the invention may have a transparent support. As the transparent support, a glass plate or a polymer film is used, and a polymer film is preferably used. The support being transparent means that the light transmittance is 80% or more. In general, an optically isotropic polymer film is used as the transparent support. The polymer film being optically isotropic means that, specifically, the in-plane retardation (Re) is preferably less than 10 nm, and more preferably less than 5 nm. In addition, in an optically isotropic transparent support, the retardation (Rth) in a thickness direction is also preferably less than 10 nm, and more preferably less than 5 nm. The in-plane retardation (Re) and retardation (Rth) in the thickness direction of the transparent support are defined respectively using the following formulae.

$$Re=(nx-ny)d$$

$$Rth=[\{(nx+ny)/2\}-nz]d$$

In the formulae, nx and ny represent the in-plane refractive indexes of the transparent support, nz represents the refractive index of the transparent support in the thickness direction, and d represents the thickness of the transparent support.

There is a case in which an optically anisotropic polymer film is used as the transparent support. In such a case, the transparent support is preferably optically uniaxial or biaxial. In the case of an optically uniaxial support, the support may be optically positive (the refractive index in the light axis direction is larger than the refractive index in the direction perpendicular to the light axis) or negative (the refractive index in the light axis direction is smaller than the refractive index in the direction perpendicular to the light axis). In the case of an optically biaxial support, the refractive indexes nx, ny and nz in the above-described formulae all become different values (nx#ny#nz). The in-plane retardation (Re) of the optically anisotropic transparent support is preferably 10 nm to 1000 nm, more preferably 15 nm to 300 nm, and most preferably 20 nm to 200 nm. The retardation (Rth) in the thickness direction of the optically anisotropic transparent support is preferably 10 nm to 1000 nm, more preferably 15 nm to 300 nm, and still more preferably 20 nm to 200 nm.

A material that forms the transparent support is determined depending on whether the support is optically isotropic or optically anisotropic. In the case of the optically isotropic support, in general, glass or cellulose esters are used. In the case of the optically anisotropic support, in general, a synthetic polymer (for example, a polycarbonate, a polysulfone, a polyethersulfone, a polyacrylate, a polymethacrylate or a norbornene resin) is used. However, it is also possible to manufacture an optically anisotropic cellulose ester film (having a high retardation) through (1) use of a retardation enhancer, (2) a decrease in the acetylation degree of cellulose acetate or (3) manufacturing of a film using a cooling solution method which is described in the specification of European Patent No. 0911656A2. A transparent support made of a polymer film is preferably formed using a solvent casting method.

In order to obtain an optically anisotropic transparent support, a stretching treatment is preferably carried out on a polymer film. In a case in which an optically uniaxial support is manufactured, an ordinary uniaxial stretching treatment or an ordinary biaxial stretching treatment may be carried out. In a case in which an optically biaxial support is manufactured, an unbalanced biaxial stretching treatment is preferably carried out. In unbalanced biaxial stretching, a polymer film is stretched in a certain direction at a certain scaling factor (for example, 3% to 100%, and preferably 5% to 30%), and stretched in a direction perpendicular to the former direction at an equal or larger scaling factor (for example, 6% to 200%, and preferably 10% to 90%). The stretching treatments in the two directions may be carried out at the same time. The stretching direction (in the unbalanced biaxial stretching, the direction with a larger stretching scaling factor) and the in-plane slow axis of the stretched film preferably become substantially the same direction. The angle between the stretching direction and the slow axis is preferably less than 10°, more preferably less than 5°, and most preferably less than 3°.

The thickness of the transparent support is preferably 10 μm to 500 μm, and more preferably 50 μm to 200 μm. In order to improve the adhesion between the transparent support and a layer provided thereon (an adhesion layer, an oriented film or an optically anisotropic layer), a surface treatment (for example, a glow discharge treatment, a corona discharge treatment, an ultraviolet (UV) treatment or a flame treatment) may be carried out on the transparent support. An ultraviolet absorber may be added to the transparent support. An adhesion layer (basecoat layer) may be provided on the transparent support. The adhesion layer is described in JP-A-7-333433. The thickness of the adhesion layer is preferably 0.1 μm to 2 μm, and more preferably 0.2 μm to 1 μm.

EXAMPLES

Hereinafter, the characteristics of the invention will be more specifically described using examples and comparative examples below. Materials, use amounts, fractions, treatment contents, treatment order and the like described in the following examples can be appropriately changed within the scope of the purport of the invention. Therefore, the range of the invention is not supposed to be restrictively interpreted based on specific examples described below.

Synthesis Example 1

A compound (1) was synthesized using the following route.

(1-1) Synthesis of an Ester (1b)

An alcohol (1a) (70.0 g, 200 mmol) was added to methylene chloride (100 ml), and triethylamine (29.2 ml, 210 mmol) was added to the solution. The solution was immersed in icy water, trifluoromethanesulfonic anhydride (35.3 ml, 210 mmol) was added dropwise so that the inside temperature became 20° C. or lower, and the solution was reacted over 1 hour under ice cooling. Reaction liquids were separated, and an organic layer was condensed using an evaporator. The obtained liquid was distilled under reduced pressure, thereby obtaining a corresponding trifluoromethanesulfonate ester (1b) (85.0 g, percentage yield 88%).

$^1$H NMR (300 MHz, CDCl$_3$) δ4.8 (t, 2H)

(1-2) Synthesis of an Aldehyde (1c)

The ester (1b) (26.5 g, 55 mmol) and parahydroxybenzaldehyde (6.1 g, 50 mmol) were reacted in DMAc (30 ml) in the presence of potassium carbonate (7.6 g, 55 mmol) at 90° C. over 2 hours. After a liquid separation treatment, an aldehyde (1c) was obtained using a condensation operation as a crude substance. The aldehyde was used as it was in the subsequent steps without being purified.

$^1$H NMR (300 MHz, CDCl$_3$) δ4.6 (t, 2H), 7.1 (d, 2H), 7.9 (d, 2H), 9.9 (s, 1H)

(1-3) Synthesis of a Carboxylic Acid (1d)

A carboxylic acid (1d) was derived from the aldehyde (1c) using the method described in [0085] to [0087] on page 10 of JP-A-2002-97170 (15.2 g, total percentage yield from ester (1b) 65%)

$^1$H NMR (400 MHz, CDCl$_3$) δ4.6 (t, 2H), 7.1 (d, 2H), 8.2 (d, 2H)

(1-4) Synthesis of the Compound (1)

The carboxylic acid (1d) (3.3 g, 7.1 mmol) was reacted with toluene (15 ml) and a catalytic amount of thionyl chloride (0.77 ml, 10.6 mmol) in DMF so as to produce an acid chloride, excess thionyl chloride and excess toluene were removed, and then THF (5 ml) was added to the system. Methylhydroquinone (434 mg, 3.5 mmol) dissolved in THF (5 ml) and diisopropylethylamine (1.4 ml) was added dropwise. After a liquid separation operation, the solution was condensed using an evaporator, and recrystallized using methanol, thereby obtaining the compound (1) (2.5 g, 69%).

$^1$H NMR (400 MHz, CDCl$_3$) δ2.3 (s, 3H), 4.6 (t, 4H), 7.0-7.2 (d×2/s×3, 7H), 8.2 (d×2, 4H)

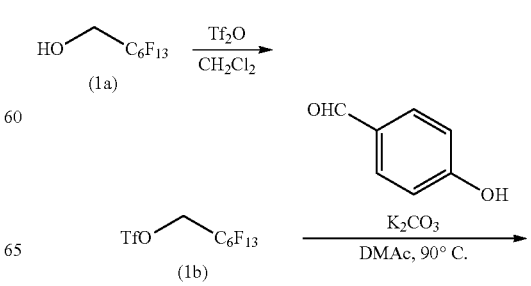

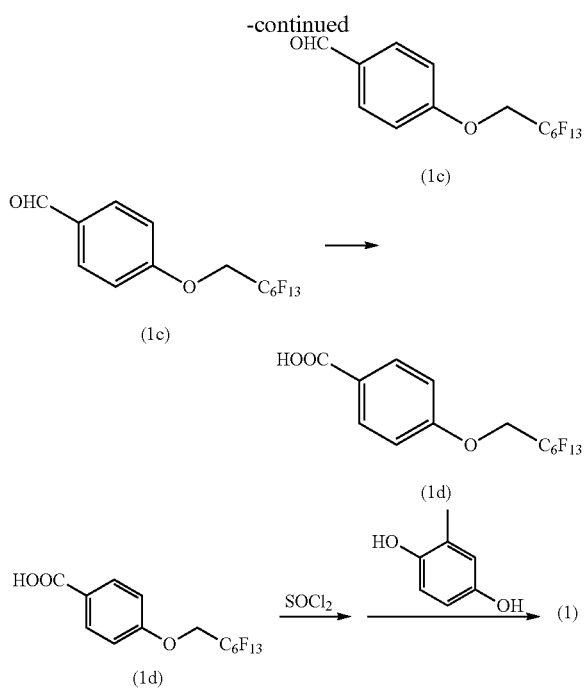

Synthesis Example 2

A compound (2) was synthesized using the following route.

(2-1) Synthesis of a Tosyl Derivative (2b)

An alcohol (2a) (45.7 ml, 300 mmol) and paratoluenesulfonyl chloride (60.1 g, 315 mmol) were reacted in methylene chloride (120 ml) under ice cooling over 1 hour. Reaction liquids were separated, and an organic layer was condensed using an evaporator, thereby obtaining a tosyl ether substance (2b) of a yellow liquid as a crude substance. The tosyl ether was used as a raw material in the subsequent steps without being purified.

$^1$H NMR (300 MHz, CDCl$_3$) δ2.4 (s, 3H), 3.6 (d, 2H), 4.2 (d, 2H), 4.4 (s, 2H), 7.1-7.4 (d×3, s×1, 7H), 7.8 (d, 2H)

(2-2) Synthesis of an Alkyl Fluoride Ether (2d)

The tosyl derivative (2b) (16.2 g, 50 mmol) and an alcohol fluoride (2c) (12.1 ml, 55 ml) were added to toluene (100 ml), and an aqueous solution of benzyltrimethlyammonium hydroxide (105 ml) was added. The solution was heated to 70° C., stirred for 30 minutes, and then an aqueous solution of potassium hydroxide (3.1 g/20 ml of water) was added. After that, the solution was heated to 80° C., and reacted over 5 hours. Ethyl acetate (100 ml) and water (50 ml) were added, liquids were separated, and then the solution was condensed, thereby obtaining an ether (2d) as a crude substance. The ether was used as it was as a raw material in the subsequent steps without being purified.

$^1$H NMR (300 MHz, CDCl$_3$) δ2.5 (m, 2H), 3.8 (d, 2H), 4.0 (d, 2H), 4.4 (s, 2H), 7.1-7.4 (m, 5H)

(2-3) Synthesis of an Alcohol (2e)

The ether (2d) (20.0 g, 40 mmol) was reacted with hydrogen in ethyl acetate (40 ml) in the presence of a palladium catalyst (1.2 g, 5% palladium/active carbon, Degussa-type E101 O/W 5% Pd, manufactured by Wako Pure Chemical Industries, Ltd.). After the completion of the reaction, the palladium catalyst was removed through celite filtration, and the solution was condensed, thereby obtaining a crude substance of an alcohol (2e). The alcohol was used as it was as a raw material in the subsequent steps without being purified.

$^1$H NMR (400 MHz, CDCl$_3$) δ2.4 (m, 2H), 3.6 (d, 2H), 3.7 (d, 2H), 3.8 (d, 2H)

(2-4) Synthesis of Methanesulfonate Ester (2f)

The alcohol (2e) (18.0 g, 45 mmol) was added to ethyl acetate (30 ml), and cooled using ice. The temperature of a reaction system was maintained at 20° C. or lower, and methanesulfonyl chloride (3.8 ml, 49.5 mmol) was added dropwise. The solution was reacted at room temperature over 3 hours, liquids were separated using ethyl acetate and water, and the solution was condensed, thereby obtaining a crude substance of methanesulfonate ester (2f). The methanesulfonate ester was used as it was as a raw material in the subsequent steps without being purified.

(2-5) Synthesis of an Aldehyde (2g)

The ester (2f) (18.5 g, 42.8 mmol) and parahydroxybenzaldehyde (5.22 g, 42.8 mmol) were reacted in DMAc (40 ml) in the presence of potassium carbonate (6.51 g, 47.1 mmol) at 90° C., thereby obtaining a crude substance of an aldehyde (2g). The aldehyde (2g) (10.5 g) was obtained through column purification.

$^1$H NMR (400 MHz, CDCl$_3$) δ2.3-2.5 (m, 2H), 3.8 (d×2, 4H), 4.2 (d, 2H), 7.0 (d, 2H), 7.8 (d, 2H), 9.9 (s, 1H)

(2-6) Synthesis of a Carboxylic Acid (2h)

A carboxylic acid (2h) was derived from the aldehyde (2 g) (10.5 g, 20.5 mmol) using the method described in [0085] to on page 10 of JP-A-2002-97170 (8.2 g, percentage yield 76%)

$^1$H NMR (400 MHz, CDCl$_3$) δ7.0 (t, 2H), 7.8 (d, 2H), 8.2 (d, 2H)

(2-7) Synthesis of a Compound (2)

The carboxylic acid (2h) (2.1 g, 4.0 mmol) was reacted with toluene (10 ml) and a catalytic amount of thionyl chloride (0.44 ml, 6.0 mmol) in DMF so as to produce an acid chloride, excess thionyl chloride and excess toluene were removed, and then THF (5 ml) was added to the system. Methylhydroquinone (248 mg, 2.0 mmol) dissolved in THF (5 ml) and diisopropylethylamine (0.73 ml) was added dropwise. After a liquid separation operation, the solution was condensed using an evaporator, and recrystallized using methanol, thereby obtaining a compound (2) (1.5 g, 60%).

$^1$H NMR (400 MHz, CDCl$_3$) δ2.3 (s, 3H), 2.4-2.5 (m, 4H), 3.8 (d×2.8H), 4.2 (d, 4H), 7.0 (d×2, 4H), 7.0-7.2 (s×1d×2, 3H), 8.2 (d×2, 4H)

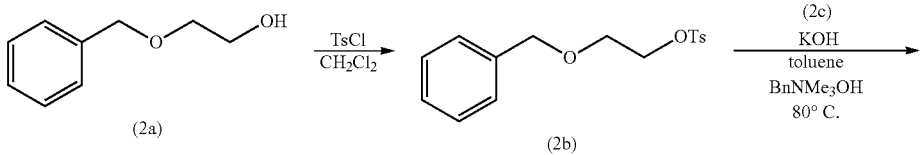

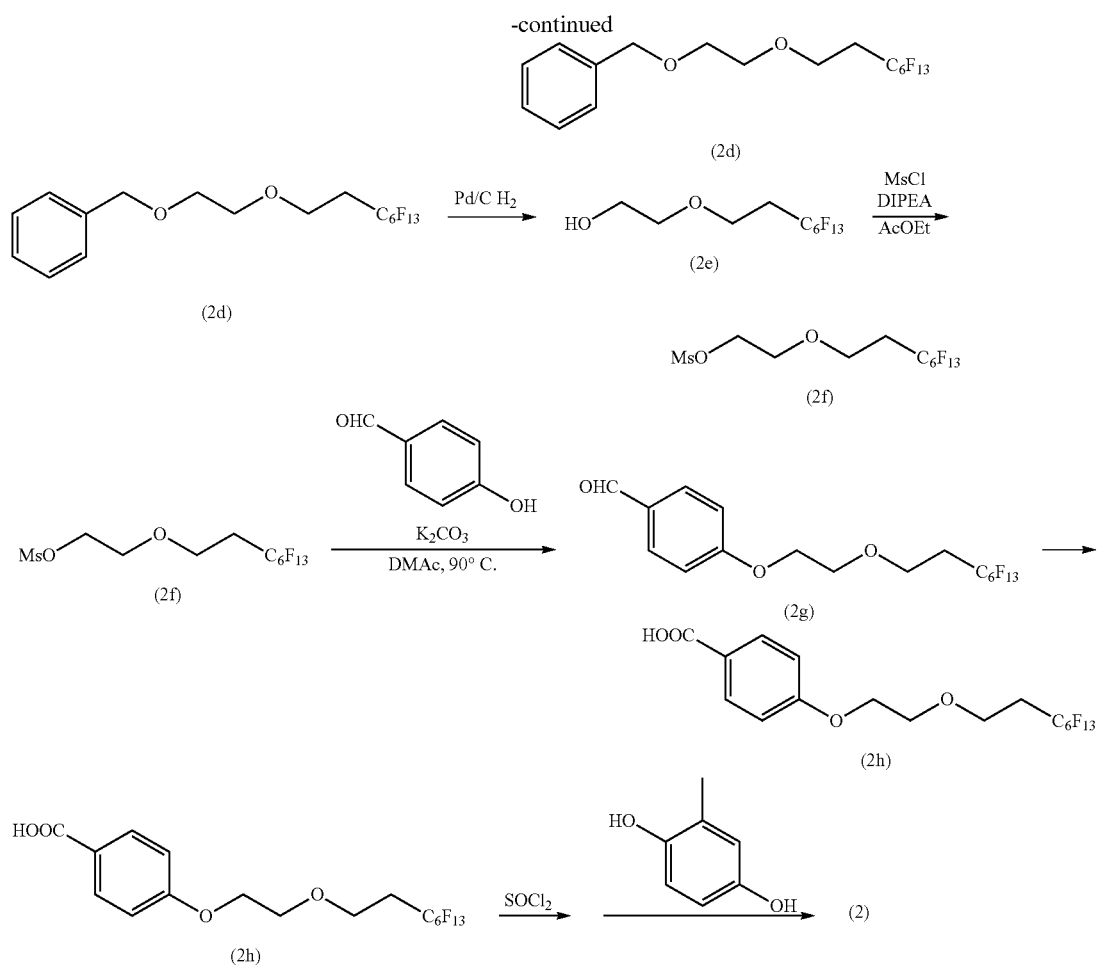

Synthesis Example 3

A compound (64) was synthesized using the following route.

Synthesis can be performed up to a carboxylic acid (3a) via a route described below using a well-known synthesis method. The carboxylic acid (3a) (2.34 g, 4.0 mmol) was reacted with toluene (10 ml) and a catalytic amount of thionyl chloride (0.44 ml, 6.0 mmol) in DMF so as to produce an acid chloride, excess thionyl chloride and excess toluene were removed, and then THF (5 ml) was added to the system. Methylhydroquinone (124 mg, 2.0 mmol) dissolved in THF (5 ml) and diisopropylethylamine (0.77 ml) was added dropwise. After a liquid separation operation, the solution was condensed using an evaporator, and recrystallized using ethyl acetate/methanol, thereby obtaining a compound (64) (0.79 g, 31%).

$^1$H NMR (400 MHz, CDCl$_3$) δ2.3 (s, 3H), 2.4-2.6 (m, 4H), 2.8 (t, 4H), 3.0 (t, 4H), 4.5 (t, 4H), 7.0-7.2 (d×2/s×1, 3H), 7.3 (d×2, 4H), 8.2 (d×2, 4H)

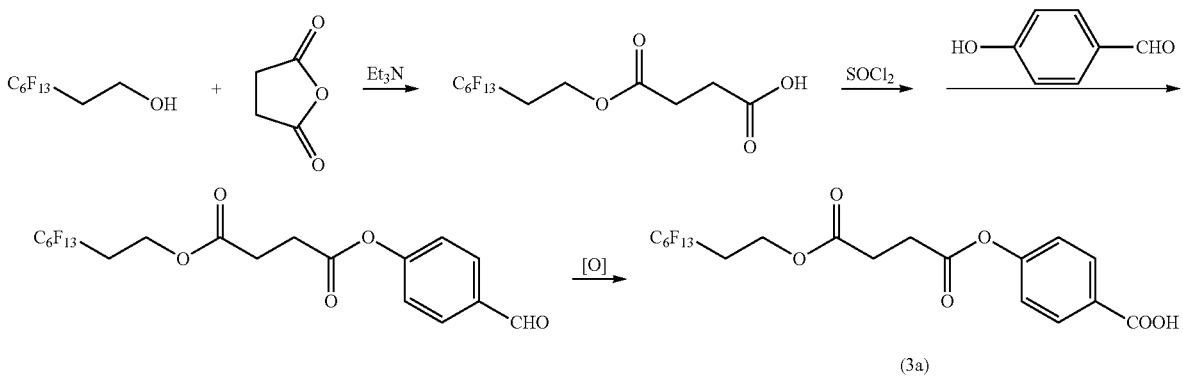

-continued

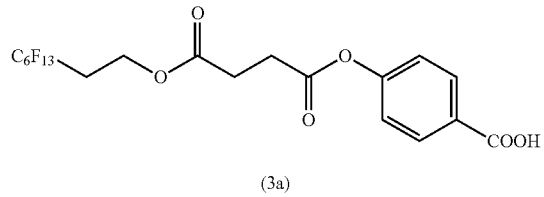

(3a)

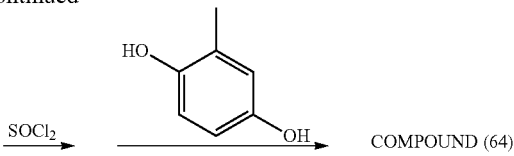

COMPOUND (64)

Synthesis Example 4

A compound (4) was obtained using the same operations as in Synthesis Example 2 except that 4-amino-m-cresol was used instead of methylhydroquinone in Synthesis Example 2.

$^1$H NMR (300 MHz, CDCl$_3$) δ2.3 (s, 3H), 2.3-2.6 (m, 4H), 3.9 (t×2, 8H), 4.2 (t, 4H), 7.0 (d×2, 4H), 7.1 (s×1, d×1, 2H), 7.6 (s, 1H), 7.8 (d, 2H), 7.9 (d, 1H), 8.1 (d, 2H)

Synthesis Example 5

Synthesis of a Compound (73)

perature was increased to 90° C., and the solution was stirred over 3 hours. The solution was cooled to room temperature, then, ethyl acetate was added, and 1 mol/l of hydrochloric acid was added, thereby separating liquids. After a water layer was removed, saturated saline was added, liquids were separated again, and then the solution was condensed using a rotary evaporator. After hexane was added, heated and refluxed, a compound (5a) was obtained through suction filtration (0.71 g, percentage yield 49%).

(5-2) Synthesis of a Compound (73)

A compound (73) was synthesized in the same manner except that the compound (5a) was used instead of methylhydroquinone in the synthesis of the compound (2).

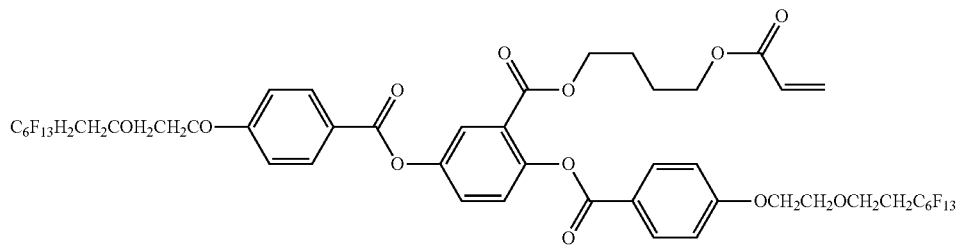

A compound (73) was synthesized using the following route.

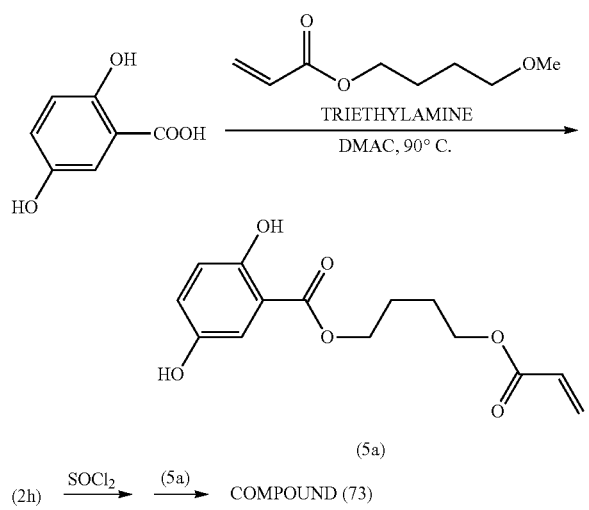

(5-1) Synthesis of a Compound (5a)

2,5-Dihydroxybenzoic acid (800 mg, 5.19 mmol), triethylamine (731 μl, 5.20 mmol) and sulfonic acid ester (1.16 g, 5.20 mmol) were added to DMAc (8 ml), the outside tem- $^1$H NMR (400 MHz, CDCl$_3$) δ1.5-1.7 (m, 4H), 2.4-2.6 (m, 4H), 3.5 (m, 4H), 3.8-3.9 (m, 8H), 4.0 (t, 2H), 4.2-4.3 (m, 6H), 5.8 (d, 1H), 6.0-6.1 (dd, 1H), 6.3-6.4 (d, 1H), 7.0 (m, 4H), 7.3 (dd, 1H), 7.5 (dd, 1H), 7.9 (d, 1H), 8.2 (m, 4H)

Examples 1 to 8 and Comparative Examples 1 to 3

Optically anisotropic films were formed using liquid crystal orientation promoters described in Table 1, and evaluated. First, coating fluids having the following compositions were prepared. The liquid crystal orientation promoters were prepared so that the concentrations became 0.01 parts by mass, 0.10 parts by mass and 0.20 parts by mass with respect to a rod-shaped liquid crystalline compound.

| | |
|---|---|
| Rod-shaped liquid crystalline compound 1 described below | 100 parts by mass |
| Chiral agent (A) described below | 2.8 parts by mass |
| IRGACURE 819 (manufactured by Ciba Japan K. K.) | 3 parts by mass |
| Liquid crystal orientation promoter described in Table 1 | above amount |
| Solvent described in Table 1 | amount at which the solute concentration becomes 25 mass % |

Rod-shaped liquid crystalline compound 1

-continued

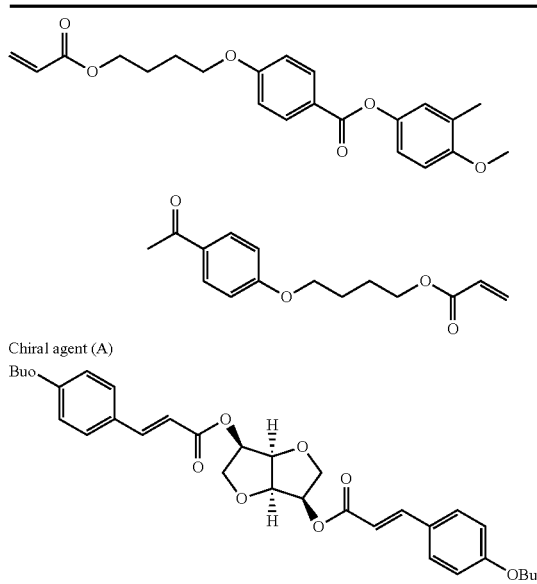

Chiral agent (A)

The prepared coating fluid was taken in an amount of 50 μl using a micropipette, added dropwise to an oriented film-attached glass plate (SE-130), and spin-coated at a rotation rate of 2000 rpm. The coating fluid was heated at 85° C. for 2 minutes, cooled in the air for 1 minute, and then irradiated with ultraviolet rays in a nitrogen atmosphere (ultraviolet ray intensity: 500 mJ/m$^2$), thereby forming an optically anisotropic film. The film thickness of the optically anisotropic film was approximately 5 μm.

The orientation properties of the respective prepared optically anisotropic films were evaluated through visual checking and haze. The haze was measured using a haze meter NDH 2000 manufactured by Nippon Denshoku Co., Ltd.

In orientation promotion tests, the orientation promotion actions of the liquid crystal orientation promoters were evaluated by the following 4 levels based on the haze values of the optically anisotropic films in which the concentrations of the liquid crystal orientation promoters were 0.01 mass %. It is indicated that, at a concentration of 0.01 mass %, the liquid crystal orientation promoter is fully dissolved in a solvent, and the liquid crystal orientation promotion action is enhanced as the measured haze value decreases.

| A | less than 5.5 |
| B | 5.5 or more and less than 8.5 |
| C | 8.5 or more and less than 10.0 |
| D | 10.0 or more |

In dissolution and orientation promotion tests, the dissolution and orientation promotion actions were evaluated by the following 4 levels based on the haze values of the optically anisotropic films in which the concentrations of the liquid crystal orientation promoters were 0.10 mass % and 0.20 mass %. Favorable evaluation indicates that the solubility is favorable and the orientation promotion action is also large. Poor evaluation indicates that, mainly, the solubility is poor.

| A | less than 0.25 |
| B | 0.25 or more and less than 0.60 |
| C | 0.60 or more and less than 1.00 |
| D | 1.00 or more |

TABLE 1

| | Liquid crystal orientation promoter | Solvent | Orientation promotion test Concentration 0.01 mass % | Dissolution and orientation promotion test | | |
|---|---|---|---|---|---|---|
| | | | | Concentration 0.03 mass % | Concentration 0.10 mass % | Concentration 0.20 mass % |
| Example 1 | Compound (1) | Chloroform | A | A | A | B |
| Example 2 | Compound (2) | Chloroform | A | A | A | B |
| Example 3 | Compound (64) | Chloroform | B | A | A | A |
| Example 4 | Compound (73) | Chloroform | C | A | B | B |
| Comparative Example 1 | Compound (A) | Chloroform | C | A | B | D |
| Example 5 | Compound (1) | Methyl ethyl ketone | A | A | A | B |
| Example 6 | Compound (2) | Methyl ethyl ketone | A | A | A | B |
| Example 7 | Compound (64) | Methyl ethyl ketone | B | A | A | B |
| Example 8 | Compound (73) | Methyl ethyl ketone | C | A | A | B |
| Comparative Example 2 | Compound (A) | Methyl ethyl ketone | B | B | B | D |
| Comparative Example 3 | Compound (B) | Methyl ethyl ketone | C | B | D | D |

(Note)
0.01, 0.03, 0.10 and 0.20 in the table represent the concentrations of the liquid crystal orientation promoters with respect to the rod-shaped liquid crystalline compound.
A compound (A) [the compound (30) of JP-A-2002-129162]

TABLE 1-continued

| Liquid crystal orientation promoter | Solvent | Orientation promotion test Concentration 0.01 mass % | Dissolution and orientation promotion test | | |
|---|---|---|---|---|---|
| | | | Concentration 0.03 mass % | Concentration 0.10 mass % | Concentration 0.20 mass % |

A compound (B) [the compound (35) of JP-A-2002-129162]

As described in Table 1, it was confirmed that the liquid crystal orientation promoter of the invention has a large liquid crystal orientation action and a high solubility in a solvent even at a high concentration. In addition, it was confirmed that the promoter exhibits the same tendency even in different solvents, and the liquid crystal orientation promoter of the invention has a wide application range of a coating solvent and a high usage aptitude.

While the present invention has been described in detail and with reference to specific embodiments thereof, it will be apparent to one skilled in the art that various changes and modifications can be made therein without departing from the spirit and scope thereof.

The present disclosure relates to the subject matter contained in International Application No. PCT/JP2012/057281, filed Mar. 22, 2012; and Japanese Application No. 2011-066174, filed Mar. 24, 2011, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A liquid crystalline composition comprising polymerizable liquid crystalline molecules and a compound represented by the formula (I):

Hb-(L$^1$)$_k$-Sp-(L$^2$-A$^1$)$_l$-L$^3$-T-L$^4$-(A$^2$-L$^5$)$_m$-Sp-(L$^6$)$_n$-Hb    Formula (I)

wherein:
each of L$^1$, L$^2$, L$^3$, L$^4$, L$^5$ and L$^6$ independently represents a single bond, —O—, —S—, —CO—, —COO—, —OCO—, —COS—, —SCO—, —NRCO— or —CONR— in which R represents a hydrogen atom or an alkyl group having 1 to 6 carbon atoms;

Sp represents a single bond or an alkylene group having 1 to 10 carbon atoms, in which non-adjacent methylene groups in the alkylene may be substituted by —O—, —S—, —CO—, —COO—, —OCO—, —COS—, —SCO—, —NRCO—, —CONR— or —OH, each of A$^1$ and A$^2$ independently represents a divalent aromatic hydrocarbon group or a heterocyclic group, T represents a divalent group or an aromatic heterocyclic group represented by

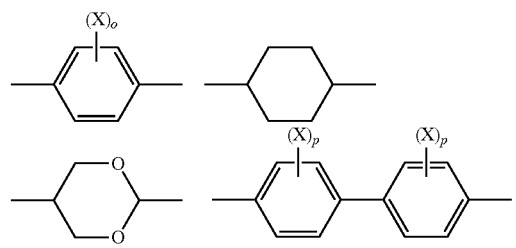

-continued

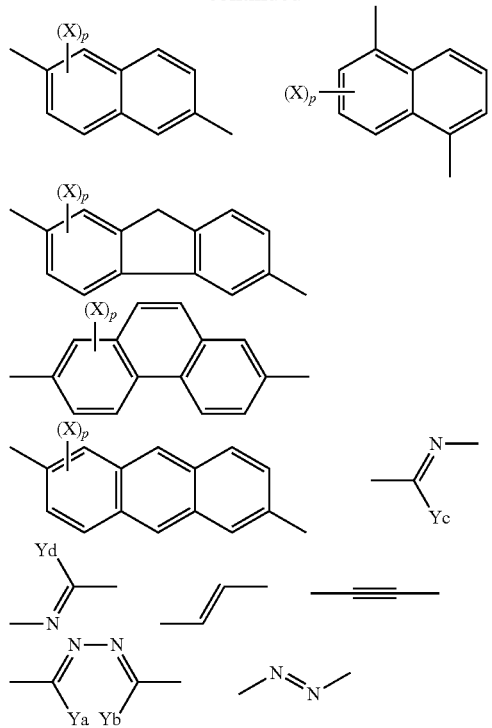

in which X represents an alkyl group having 1 to 8 carbon atoms, an alkoxy group, a halogen atom, a cyano group or —COOR⁰, R⁰ represents a hydrogen atom, an alkyl group or an alkyl fluoride group in which an adjacent $CH_2$ may be substituted by O or S, or -$Sp^5$-P, $Sp^5$ represents a single bond or an alkylene group having 1 to 10 carbon atoms in which a hydrogen atom in the alkylene group may be substituted by a fluorine atom, and P represents a polymerizable group, and each of Ya, Yb, Yc and Yd independently represents a hydrogen atom or an alkyl group having 1 to 4 carbon atoms;

Hb represents an alkyl fluoride group having 3 to 30 carbon atoms, and each of k, l, m, n and p independently represents an integer of 0 or more, o is any integer of 1 to 4, and when k, l, m, n, o and p are 2 or more, a plurality of structures in parentheses may be equal or different.

2. The liquid crystalline composition according to claim 1, wherein the polymerizable liquid crystalline molecules are polymerizable rod-shaped molecules.

3. The liquid crystalline composition according to claim 1 comprising at least one chiral compound.

4. A macromolecular material formed by polymerizing a liquid crystalline composition which comprises polymerizable liquid crystalline molecules and a compound represented by the formula (I):

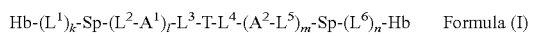

wherein:

each of $L^1$, $L^2$, $L^3$, $L^4$, $L^5$ and $L^6$ independently represents a single bond, —O—, —S—, —CO—, —COO—, —OCO—, —COS—, —SCO—, —NRCO— or —CONR— in which R represents a hydrogen atom or an alkyl group having 1 to 6 carbon atoms;

Sp represents a single bond or an alkylene group having 1 to 10 carbon atoms, in which non-adjacent methylene groups in the alkylene may be substituted by —O—, —S—, —CO—, —COO—, —OCO—, —COS—, —SCO—, —NRCO—, —CONR— or —OH, each of $A^1$ and $A^2$ independently represents a divalent aromatic hydrocarbon group or a heterocyclic group, T represents a divalent group or an aromatic heterocyclic group represented by

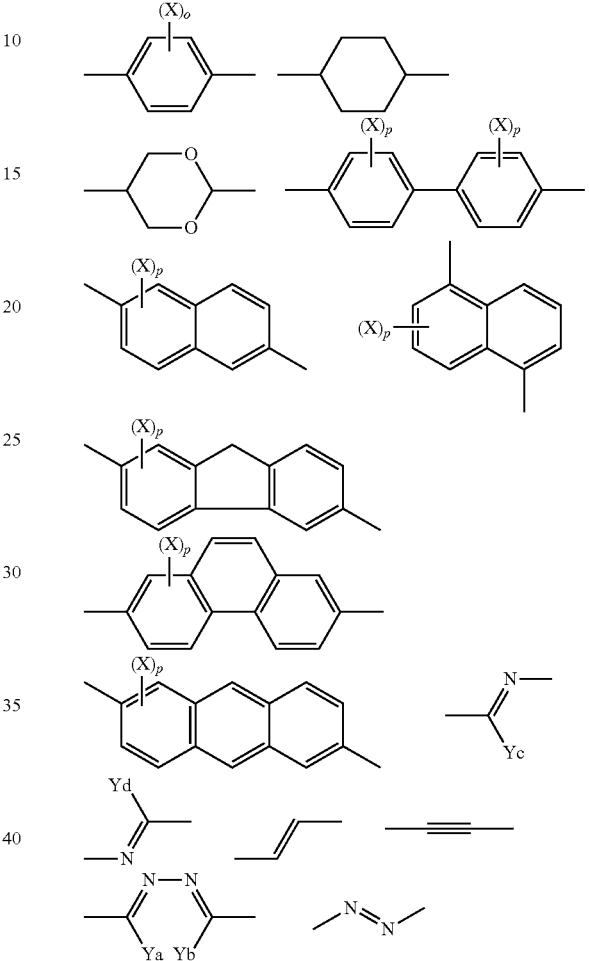

in which X represents an alkyl group having 1 to 8 carbon atoms, an alkoxy group, a halogen atom, a cyano group or —COOR⁰, R⁰ represents a hydrogen atom, an alkyl group or an alkyl fluoride group in which an adjacent $CH_2$ may be substituted by O or S, or -$Sp^5$-P, $Sp^5$ represents a single bond or an alkylene group having 1 to 10 carbon atoms in which a hydrogen atom in the alkylene group may be substituted by a fluorine atom, and P represents a polymerizable group, and each of Ya, Yb, Yc and Yd independently represents a hydrogen atom or an alkyl group having 1 to 4 carbon atoms;

Hb represents an alkyl fluoride group having 3 to 30 carbon atoms, and each of k, l, m, n and p independently represents an integer of 0 or more, o is any integer of 1 to 4, and when k, l, m, n, o and p are 2 or more, a plurality of structures in parentheses may be equal or different.

5. A film comprising at least one of the macromolecular materials which is formed by polymerizing a liquid crystalline composition comprising polymerizable liquid crystalline molecules and a compound represented by the formula (I):

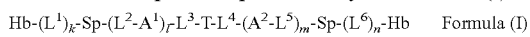

wherein:
each of $L^1$, $L^2$, $L^3$, $L^4$, $L^5$ and $L^6$ independently represents a single bond, —O—, —S—, —CO—, —COO—, —OCO—, —COS—, —SCO—, —NRCO— or —CONR— in which R represents a hydrogen atom or an alkyl group having 1 to 6 carbon atoms;

Sp represents a single bond or an alkylene group having 1 to 10 carbon atoms, in which non-adjacent methylene groups in the alkylene may be substituted by —O—, —S—, —CO—, —COO—, —OCO—, —COS—, —SCO—, —NRCO—, —CONR— or —OH, each of $A^1$ and $A^2$ independently represents a divalent aromatic hydrocarbon group or a heterocyclic group, T represents a divalent group or an aromatic heterocyclic group represented by

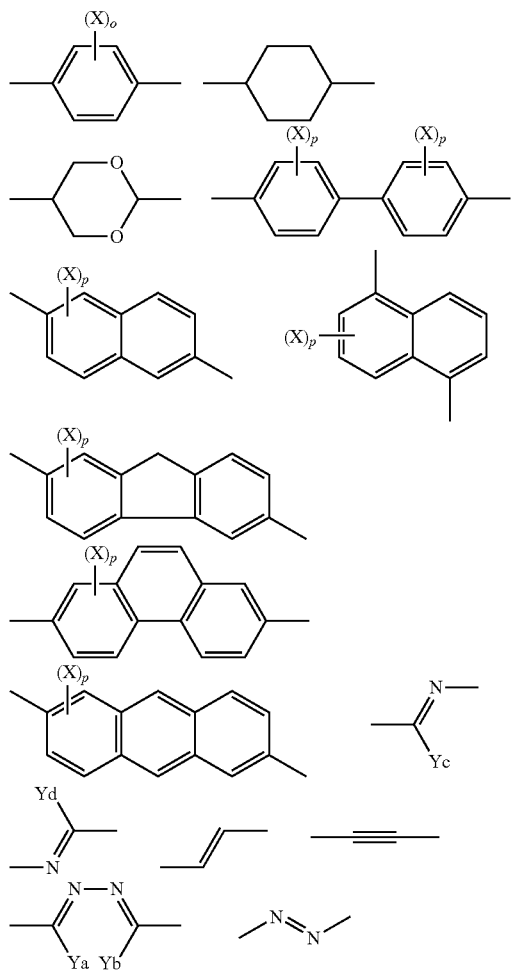

in which X represents an alkyl group having 1 to 8 carbon atoms, an alkoxy group, a halogen atom, a cyano group or —COOR⁰, R⁰ represents a hydrogen atom, an alkyl group or an alkyl fluoride group in which an adjacent CH$_2$ may be substituted by O or S, or -Sp⁵-P, Sp⁵ represents a single bond or an alkylene group having 1 to 10 carbon atoms in which a hydrogen atom in the alkylene group may be substituted by a fluorine atom, and P represents a polymerizable group, and each of Ya, Yb, Yc and Yd independently represents a hydrogen atom or an alkyl group having 1 to 4 carbon atoms;

Hb represents an alkyl fluoride group having 3 to 30 carbon atoms, and each of k, l, m, n and p independently represents an integer of 0 or more, o is any integer of 1 to 4, and when k, l, m, n, o and p are 2 or more, a plurality of structures in parentheses may be equal or different.

6. A film formed by fixing a cholesteric liquid crystalline phase of a liquid crystalline composition which comprises polymerizable liquid crystalline molecules and a compound represented by the formula (I):

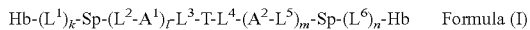

wherein:
each of $L^1$, $L^2$, $L^3$, $L^4$, $L^5$ and $L^6$ independently represents a single bond, —O—, —S—, —CO—, —COO—, —OCO—, —COS—, —SCO—, —NRCO— or —CONR— in which R represents a hydrogen atom or an alkyl group having 1 to 6 carbon atoms;

Sp represents a single bond or an alkylene group having 1 to 10 carbon atoms, in which non-adjacent methylene groups in the alkylene may be substituted by —O—, —S—, —CO—, —COO—, —OCO—, —COS—, —SCO—, —NRCO—, —CONR— or —OH, each of $A^1$ and $A^2$ independently represents a divalent aromatic hydrocarbon group or a heterocyclic group, T represents a divalent group or an aromatic heterocyclic group represented by

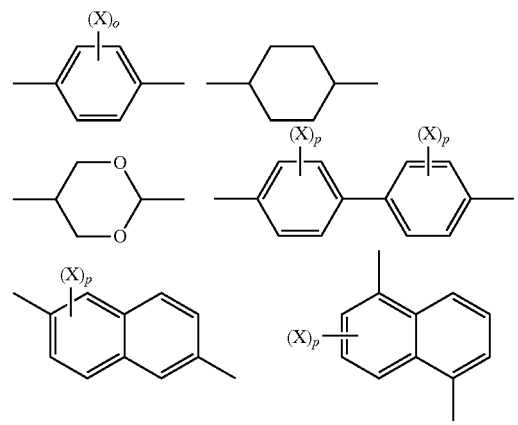

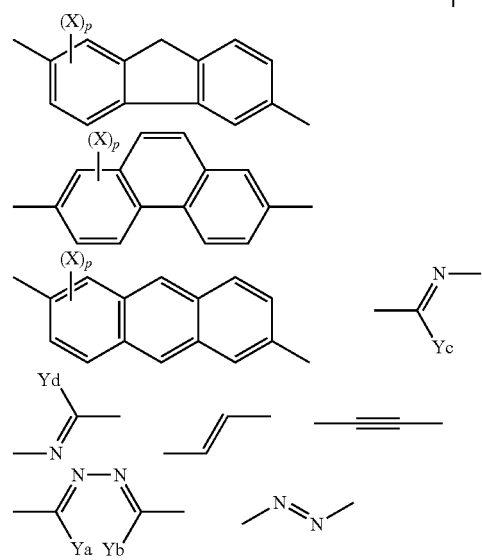

in which X represents an alkyl group having 1 to 8 carbon atoms, an alkoxy group, a halogen atom, a cyano group or —COOR$^O$, R$^O$ represents a hydrogen atom, an alkyl group or an alkyl fluoride group in which an adjacent CH$_2$ may be substituted by O or S, or -Sp$^5$-P, Sp$^5$ represents a single bond or an alkylene group having 1 to 10 carbon atoms in which a hydrogen atom in the alkylene group may be substituted by a fluorine atom, and P represents a polymerizable group, and each of Ya, Yb, Ye and Yd independently represents a hydrogen atom or an alkyl group having 1 to 4 carbon atoms;

Hb represents an alkyl fluoride group having 3 to 30 carbon atoms, and each of k, l, m, n and p independently represents an integer of 0 or more, o is any integer of 1 to 4, and when k, l, m, n, o and p are 2 or more, a plurality of structures in parentheses may be equal or different.

7. The film according to claim 5 exhibiting optical anisotropy.

8. The film according to claim 5 exhibiting selective reflection characteristics.

9. The film according to claim 8 exhibiting selective reflection characteristics in an infrared ray wavelength range.

* * * * *